(12) United States Patent
Tanaka et al.

(10) Patent No.: US 10,241,241 B2
(45) Date of Patent: Mar. 26, 2019

(54) LIGHT REFLECTING FILM, AND LIGHT CONTROLLING FILM, OPTICAL FILM, FUNCTIONAL GLASS AND HEAD-UP DISPLAY INCLUDING THE LIGHT REFLECTING FILM

(71) Applicant: Nippon Kayaku Kabushiki Kaisha, Chiyoda-ku, Tokyo (JP)

(72) Inventors: Kouichi Tanaka, Tokyo (JP); Chihiro Takahashi, Tokyo (JP); Yui Yokoyama, Tokyo (JP); Tomoyuki Hayasaki, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/502,899

(22) PCT Filed: Oct. 8, 2015

(86) PCT No.: PCT/JP2015/078578
§ 371 (c)(1),
(2) Date: Feb. 9, 2017

(87) PCT Pub. No.: WO2016/056617
PCT Pub. Date: Apr. 14, 2016

(65) Prior Publication Data
US 2017/0235030 A1 Aug. 17, 2017

(30) Foreign Application Priority Data

Oct. 10, 2014 (JP) ................................. 2014-208512
Jan. 9, 2015 (JP) ................................. 2015-002740
(Continued)

(51) Int. Cl.
*G02B 5/30* (2006.01)
*G02B 5/08* (2006.01)
(Continued)

(52) U.S. Cl.
CPC ............ *G02B 5/0816* (2013.01); *B60K 35/00* (2013.01); *G02B 5/08* (2013.01); *G02B 5/26* (2013.01);
(Continued)

(58) Field of Classification Search
CPC ........................ G02B 5/0816; G02F 1/133555
(Continued)

(56) References Cited

U.S. PATENT DOCUMENTS 5,841,494 A * 11/1998 Hall .................. G02F 1/133533
349/98
5,999,344 A 12/1999 Wulfsberg et al.
(Continued)

FOREIGN PATENT DOCUMENTS

CN 1873497 A 12/2006
JP H11-249061 A 9/1999
(Continued)

OTHER PUBLICATIONS

Office Action dated May 12, 2017 in a corresponding Chinese Application No. 201580019741.7.
(Continued)

*Primary Examiner* — Audrey Y Chang
(74) *Attorney, Agent, or Firm* — Pearne & Gordon LLP

(57) ABSTRACT

A light controlling film comprises a light reflecting film and a light controlling layer that are laminated. The light reflecting film comprises at least two laminated light reflecting layers including at least one of light reflecting layers PRL-1 to PRL-3 that a central reflection wavelength of 400 nm-500 nm, 500 nm-600 nm, and 600 nm-700 nm, respectively, and a reflectance to ordinary light at the central reflection wavelength of 5%-25%. The at least two light reflecting layers have central reflection wavelengths that are different from each other. All of the at least two laminated light
(Continued)

reflecting layers have a property of reflecting polarized light having the same orientation. The light controlling layer comprises two quarter wave plates, and the light reflecting film is laminated so as to be interposed between the two quarter wave plates.

17 Claims, 9 Drawing Sheets

(30) Foreign Application Priority Data

Feb. 20, 2015 (JP) ................................ 2015-032042
Jun. 9, 2015 (JP) ................................ 2015-116369

(51) Int. Cl.
    *G02F 1/1335* (2006.01)
    *G02B 5/26* (2006.01)
    *G02B 27/01* (2006.01)
    *B60K 35/00* (2006.01)

(52) U.S. Cl.
    CPC ............ *G02B 5/30* (2013.01); *G02B 5/3083* (2013.01); *G02B 27/01* (2013.01); *G02B 27/0101* (2013.01); *G02F 1/1335* (2013.01); *B60K 2350/106* (2013.01); *B60K 2350/2052* (2013.01); *B60K 2350/2069* (2013.01); *B60K 2350/921* (2013.01); *G02B 2027/012* (2013.01); *G02B 2027/0118* (2013.01); *G02B 2027/0194* (2013.01)

(58) Field of Classification Search
    USPC ......... 349/115, 114, 106, 98; 353/20; 345/7, 345/100; 359/449
    See application file for complete search history.

(56) References Cited

U.S. PATENT DOCUMENTS

| | | | |
|---|---|---|---|
| 6,572,990 B1 | 6/2003 | Oyama et al. | |
| 6,795,148 B2* | 9/2004 | Ozawa | G02F 1/133514 349/106 |
| 6,836,306 B2* | 12/2004 | Kubota | G02F 1/133555 349/114 |
| 7,123,409 B2* | 10/2006 | Umeya | G03B 21/604 349/115 |
| 7,355,796 B2 | 4/2008 | Robinson | |
| 7,787,080 B2* | 8/2010 | Umeya | G02B 17/006 349/115 |
| 7,791,807 B2 | 9/2010 | Pasca et al. | |
| 2003/0022001 A1* | 1/2003 | Durbin | B32B 17/10 428/430 |
| 2004/0135742 A1 | 7/2004 | Weber et al. | |
| 2004/0150609 A1* | 8/2004 | Kim | G09G 3/3688 345/100 |
| 2004/0233524 A1 | 11/2004 | Lippey et al. | |
| 2004/0263736 A1 | 12/2004 | Graham et al. | |
| 2005/0012882 A1* | 1/2005 | Karman | G02B 5/3016 349/115 |
| 2005/0041285 A1 | 2/2005 | Umeya | |
| 2005/0122582 A1 | 6/2005 | Umeya | |
| 2005/0128544 A1 | 6/2005 | Kim | |
| 2006/0171030 A1 | 8/2006 | Umeya | |
| 2007/0018907 A1 | 1/2007 | Koma et al. | |
| 2007/0279755 A1 | 12/2007 | Hitschmann et al. | |
| 2010/0177113 A1* | 7/2010 | Gay | G02B 27/2214 345/589 |
| 2014/0307176 A1 | 10/2014 | Neumann et al. | |
| 2015/0010761 A1 | 1/2015 | Tasaka et al. | |

FOREIGN PATENT DOCUMENTS

| | | |
|---|---|---|
| JP | H11-249062 A | 9/1999 |
| JP | H11-281916 A | 10/1999 |
| JP | 2000-028957 A | 1/2000 |
| JP | 2002-014229 A | 1/2002 |
| JP | 2002-090743 A | 3/2002 |
| JP | 2002-179668 A | 6/2002 |
| JP | 2003-050373 A | 2/2003 |
| JP | 2003-315556 A | 11/2003 |
| JP | 2004-029824 A | 1/2004 |
| JP | 2005-182976 A | 7/2005 |
| JP | 2005-242361 A | 9/2005 |
| JP | 2006-208786 A | 8/2006 |
| JP | 4955967 B2 | 3/2012 |
| JP | 2013-203827 A | 10/2013 |
| JP | 2014-071250 A | 4/2014 |
| WO | 00/33110 A1 | 6/2000 |
| WO | 2013146923 A1 | 10/2013 |
| WO | 2013/190959 A1 | 12/2013 |

OTHER PUBLICATIONS

Office Action dated Jun. 14, 2017 in a corresponding Korean Application No. 10-2017-7003109.
International Search Report from Corresponding Application No. PCT/JP2015/078578; dated Dec. 14, 2015.
Decision to Grant a Patent received in Corresponding Application No. JP2016-513159; dated Jun. 27, 2016.
Chinese Notification of Grant Patent Right for corresponding Chinese Application No. 201580019741.7 dated Oct. 9, 2017 and English translation.
Notification of Reason for Refusal dated Dec. 27, 2017 for corresponding Korean Application No. 10-2017-7003109 and English translation.
Extended European Search Report dated Mar. 8, 2018 for corresponding European Application No. 15848706.6.
English translation of Written Opinion dated Dec. 22, 2015 for corresponding International Application No. PCT/JP2015/078578.
International Preliminary Report on Patentability dated Apr. 11, 2017 for corresponding International Application No. PCT/JP2015/078578.
Grant of Patent dated May 4, 2018 for corresponding Korean Application No. 10-2017-7003109.

* cited by examiner

LIGHT REFLECTING FILM, AND LIGHT CONTROLLING FILM, OPTICAL FILM, FUNCTIONAL GLASS AND HEAD-UP DISPLAY INCLUDING THE LIGHT REFLECTING FILM

CROSS REFERENCE TO RELATED APPLICATIONS

This is the National Stage of International Application No. PCT/JP2015/078578, filed Oct. 08, 2015, which claims the benefit of Japanese Patent Application Nos. 2014-208512, 2015-002740, 2015-032042, 2015-116369 filed Oct. 10, 2014, Jan. 9, 2015, Feb. 20, 2015, and Jun. 9, 2015, respectively, and the disclosures of which are hereby incorporated by reference in their entirety.

TECHNICAL FIELD

The present invention relates to a light reflecting film that is suitable for use in, for example, a head-up display, as well as a light controlling film, an optical film, a functional glass and a head-up display including the light reflecting film.

BACKGROUND ART

Navigation systems or head-up displays (hereinafter, also referred to as HUDs) are used as a technique of presenting information to drivers of motor vehicles, aircrafts, etc. HUD is a system that projects an image emitted from an image projection unit, such as a liquid crystal display body (hereinafter, also referred to as an LCD), to, for example, a windshield of a motor vehicle.

FIG. 1 is a schematic diagram showing a HUD. As indicated by an optical path 5, light emitted from an image display units 2 reflects off the reflective mirror 3, reflects off a windshield 4, and thereafter reaches an observer 1. The observer 1 is viewing an image projected on the windshield 4, but the image appears as if it is at an image position 6 which is farther than the windshield 4. With such a technique, a driver can obtain various information while focusing ahead of the windshield 4 with almost no movement of his/her line of sight, and thus it is safer than conventional car navigation systems which require movement of the line of sight.

HUD projects display information such that the display information overlaps a view that is actually seen through the windshield 4, and thus it is desirable to display a bright and clear image without obstructing a view. To this end, it is necessary to have both transmittance sufficient for a view ahead to be viewable and reflectance sufficient for a reflection image of the HUD to be viewable. However, transmittance and reflectance are normally in a trade-off relationship, and there is a drawback that if one of them is increased, the other becomes low.

Particularly, for an automotive windshield, it is difficult to apply a member having high reflectance due to a legal limit that limits a visible light transmittance in a direction vertical to glass to be greater than or equal to 70%. Concerning such a drawback, Patent Documents 1 to 4 disclose techniques in which a combiner having light polarizing units, polarized light modulating units, and reflective polarizing units is provided in a laminated glass of the windshield, and the polarized light modulating units is controlled depending on the brightness of the surroundings to control the transmittance and the reflectance of the combiner.

Patent Document 5 discloses a technique in which a cholesteric liquid crystal layer is used as units of reflecting light and disposed in an automotive windshield.

DOCUMENT LIST

Patent Document(s)

Patent Document 1: Japanese Laid-Open Patent Publication No. H11-249061
Patent Document 2: Japanese Laid-Open Patent Publication No. H11.-249062
Patent Document 3: Japanese Laid-Open Patent Publication No. H11-281916
Patent Document 4: Japanese Laid-Open Patent Publication No. 2000-28957
Patent Document 5: United States Patent Application Publication No. 2014-0307176

SUMMARY OF INVENTION

Technical Problem

According to the techniques of Patent Documents 1, 3 and 4, a liquid crystal cell is used as polarized light-modulation units. The liquid crystal cell is usually made of a glass substrate, and thus difficult to be applied in a laminated glass of the windshield having a curved surface. Further, recently, there is a study to display an image on an entire face of the windshield, but it is extremely difficult to perform polarization-modulation on an entire face of the laminated glass using a curve-shaped liquid crystal cell. Furthermore, no HUDs have been reported which can display a bright image on a windshield while satisfying a legally regulated value of visible light transmittance, and also compatible to various color displays. Further, the liquid crystil cell serving as light polarizing units and polarization-modulation units has angle dependency, and thus polarized light-modulation performance is different in a front direction and an angled direction. Accordingly, it is difficult to view the entire face of the windshield from the driver's seat with a uniform image quality, and, in particular, with a color display, there is a drawback that a displayed color changes depending on the position from which the driver is viewing. Due to angle dependency of a polarizing reflection member, Patent Documents 2, 3 and 5 also have drawbacks that the displayed color may change when a displayed image is viewed at an angle, and also that the windshield itself including these polarizing reflection members will be colored when observed at an angle, which affects the design of a motor vehicle.

It is an object of the present invention to provide a light reflecting film which can effectively improve reflectance of particular polarized light only, while maintaining high visible light transmittance, as well as a light controlling film, an optical film, a functional glass and a head-up display including the light reflecting film.

Solution to Problem

In order to solve the aforementioned problem, the inventors have carried out assiduous studies and reached the novel findings that, by using a light reflecting film comprising at least two light reflecting layers that are laminated, the at least two light reflecting layers including at least one of light reflecting layers among a light reflecting layer PRL-1, a light reflecting layer PRL-2 and a light reflecting layer PRL-3, the light reflecting layer PRL-1 having a central reflection wavelength of greater than or equal to 400 nm but less than 500 nm and a reflectance to ordinary light at the central reflection wavelength of greater than or equal to 5% but less than or equal to 25%, the light reflecting layer PRL-2 having a central reflection wavelength of greater than or equal to 500 nm but less than 600 nm and a reflectance to ordinary light at the central reflection wavelength of greater than or equal to 5% but less than or equal to 25%, the light reflecting layer PRL-3 having a central reflection wavelength of greater than or equal to 600 nm but less than 700 nm and a reflectance to ordinary light at the central reflection wavelength of greater than or equal to 5% but less than or equal to 25%, the at least two light reflecting layers having central reflection wavelengths that are different from each other, all of the at least two light reflecting layers that are laminated having a property of reflecting polarized light that has the same orientation, and the visible light transmittance in a vertical direction with respect to the windshield is maintained at a legally regulated value which is greater than or equal to 70%, and also, by projecting an image using a projector that emits polarized light, reflectance of only the projected image can be significantly increased as compared to reflectance to ordinary light, and reached the present invention. Note that PRL is an abbreviation of Polarized Light Reflection Layer which is an alphabetical denotation representing a light reflecting layer.

That is to say, the subject matter of the present invention is as follows.

(1) A light reflecting film comprising at least two light reflecting layers that are laminated, the at least two light reflecting layers including at least one of light reflecting layers among a light reflecting layer PRL-1, a light reflecting layer PRL-2 and a light reflecting layer PRL-3, the light reflecting layer PRL-1 having a central reflection wavelength of greater than or equal to 400 nm. but less than. 500 nm and a reflectance to ordinary light at the central reflection wavelength of greater than or equal to 5% but less than or equal to 25%, the light reflecting layer PRL-2 having a central reflection wavelength of greater than or equal to 500 nm. but less than. 600 nm and a reflectance to ordinary light at the central reflection wavelength of greater than or equal to 5% but less than or equal to 25%, the light reflecting layer PRL-3 having a central reflection wavelength of greater than or equal to 600 nm. but less than. 700 nm and a reflectance to ordinary light at the central reflection wavelength of greater than or equal to 5% but less than or equal to 25%, the at least two light reflecting layers having central reflection wavelengths that are different from each other, all of the at least two light reflecting layers that are laminated having a property of reflecting polarized light that has the same orientation.

(2) The light reflecting film according to (1), wherein the at least two light reflecting layers include two or three light reflecting layers among the light reflecting layer PRL-1, the light reflecting layer PRL-2 and the light reflecting layer PRL-3.

(3) The light reflecting film according to (1) or (2), wherein the at least two light reflecting layers include a light reflecting layer PRL-4 having a central reflection wavelength of greater than or equal to 700 nm but less than or equal to 950 nm and a reflectance to ordinary light at the central reflection wavelength of greater than or equal to 5% but less than or equal to 25%, the light reflecting layer PRL-4 having a property of reflecting polarized light that has the same orientation as the light reflecting layer PRL-1, the light reflecting layer PRL-2 and the light reflecting layer PRL-3 as described in (1) Or (2).

(4) The light reflecting film according to any one of (1) to (3), wherein each of the light reflecting layers has a half width of greater than or equal to 100 nm but less than or equal to 500 nm.

(5) The light reflecting film according to any one of (1) to (4), wherein each of the light reflecting layers is a cholesteric liquid crystal layer having a fixed helical orientation.

(6) A light controlling film comprising the light reflecting film as described in any one of (1) to (5) and a light controlling layer that are laminated, the light controlling layer being at least one of a quarter wave plate and a light absorbing layer.)

(7) The light controlling film according to (6), wherein the light controlling layer is the quarter wave plate.

(8) The light controlling film according to (7), wherein the light controlling layer comprises two quarter wave plates, and the light reflecting film is laminated so as to be interposed between the two quarter wave plates.

(9) The light controlling film according to (8), wherein the two quarter wave plates are laminated with such a positional relationship that slow axes are orthogonal to each other.

(10) An optical film comprising the light reflecting film as described in any one of (1) to (5) or the light controlling film as described in any one of (6) to (9), and at least one intermediate film that are laminated.

(11) The optical film according to (10), wherein one of the light reflecting film and the light controlling film is laminated such that one of the light reflecting film and the light controlling film is interposed between two intermediate films.

(12) A functional glass comprising one of the light reflecting film as described in any one of (1) to (5), the light controlling film as described in any one of (6) to (9), and the optical film as described in (10) or (11).

(13) The functional glass according to (12), wherein any one of the light reflecting film as described in any one of (1) to (5), the light controlling film as described in any one of (6) to (9), and the optical film as described in (10) or (11) is interposed between two glass sheets to constitute a laminated glass.

(14) A head-up display comprising any one of the light reflecting film as described in any one of (1) to (5), the light controlling film as described in any one of (6) to (9), the optical film as described in (10) or (11), and the functional glass as described in (12) or13).

(15) The head-up display according to (14), comprising a projector for displaying an image, the projector being provided with a circularly-polarized light emitting units to emit circularly polarized light in the same orientation as circularly polarized light selectively reflected by the light reflecting film as described in any one of (1) to (5).

(16) The head-up display according to (14), comprising a projector for displaying an image, the projector being provided with a P polarized light emitting units.

(17) The head-up display according to (16), wherein the light controlling film as described in any one of (6) to (9), or among the optical film as described (10) or (11), and the functional glass as described in (12) or (13), one of the optical film and the functional glass laminated with a quarter wave plate is disposed in a laminated manner such that a slow axis of the quarter wave plate is at 45 degrees to emitted P polarized light.

Effects of Invention

The light reflecting film of the present invention can improve viewability of a projected image of a HUD by effectively improving reflectance of only specific polarized light while maintaining high visible light transmittance, and in particular, for a case in which visible light transmittance is legally controlled, such as a windshield, it is possible to improve only viewability of a projected image of a HUD while maintaining the required visible light transmittance. Further, a functional glass having one of the light reflecting film of the present invention as well as a light controlling film and an optical film including the light reflecting film can present a display image in the FEUD on an entire face of the windshield brightly and clearly, and, the driver can see a clear image at any portion of the windshield. Further, the projected image can be viewed as a bright image both when seen with naked eyes or seen through polarized sunglasses.

DESCRIPTION OF THE EMBODIMENTS

Figure 1:
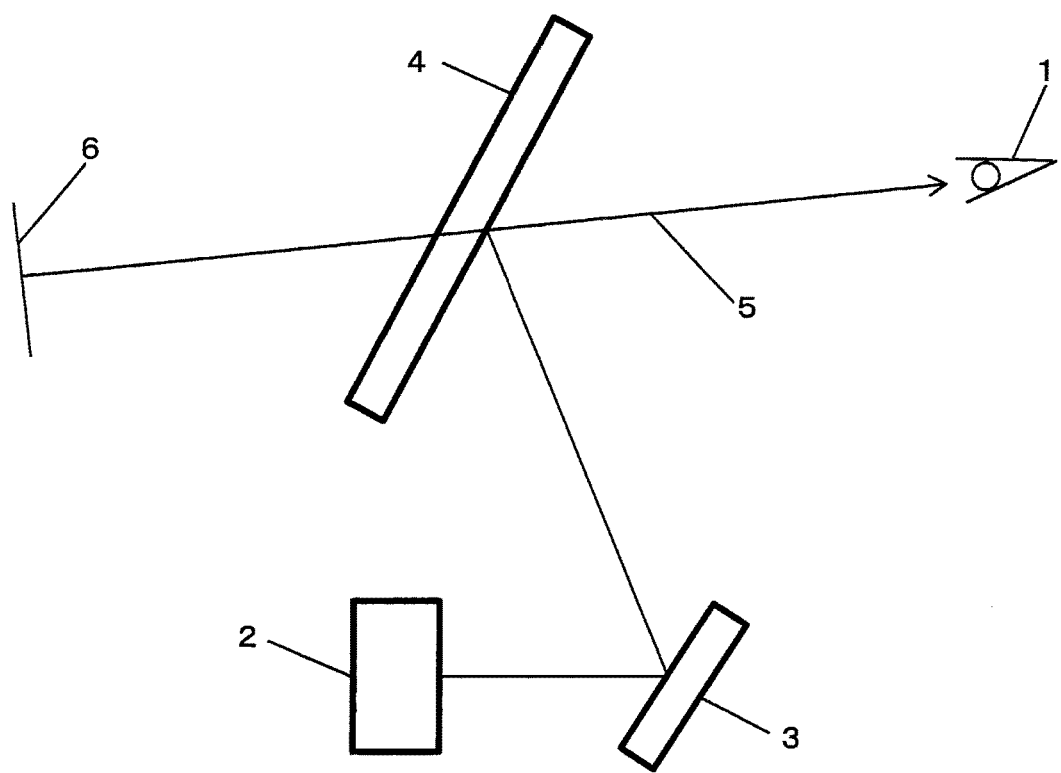
FIG. 1 is a schematic diagram showing a conventional head-up display (HUD).

Each light reflecting layer constituting a light reflecting film of the present invention has a feature of having a high reflectance to light emitted from an image display unit is converted into particular polarized light. Polarized light is mainly classified into linearly polarized light and circularly polarized light. A light reflecting layer reflecting such polarized light may be, for example, a birefringent interference-type polarizer including a polymeric multilayer film comprising two or more types of polymers of different refractive indices or a polarizer having a fine irregular structure referred to as a wire grid type for linearly polarized light, and a polarizer or the like comprising a cholesteric liquid crystal layer for circularly polarized light. Particularly, a polarizer comprising a cholesteric liquid crystal layer is preferable for circularly polarized light.

Further, the light reflecting film of the present disclosure needs to have reflectivity to wavelengths of light emitted from the image display unit, and thus it is necessary to have reflectivity to blue, green and red polarized light in visible light. On the other hand, for applications for which visible light transmittance is under legal control, such as a windshield of a vehicle, if reflectance to so-called ordinary light, i.e., light which has not been subjected to a process of extracting only a particular polarized component by a polarization filter or the like, is excessively high, transmittance will be low, and cannot be used. Accordingly, reflectance of the light reflecting film to ordinary light should be controlled appropriately. Such a light reflecting film includes at least two light reflecting layers that are laminated, the at two light reflecting layers including at least one of light reflecting layers among a light reflecting layer PRL-1, a light reflecting layer PRL-2 and a light reflecting layer PRL 3, the light reflecting layer PRL-1 having a central reflection wavelength of greater than or equal to 400 nm but less than 500 nm and a reflectance to ordinary light at the central reflection wavelength of greater than or equal to 5% but less than or equal to 25%, the light reflecting layer PRL-2 having a central reflection wavelength of greater than or equal to 500 rim but less than 600 nm and a reflectance to ordinary' light at the central reflection wavelength of greater than or equal to 5% but less than or equal to 25%, the light reflecting layer PRL-3 having a central reflection wavelength of greater than or equal to 600 nm but less than 700 nm and a reflectance to ordinary light at the central reflection wavelength of greater than or equal to 5% but less than or equal to 25%, the at two light reflecting layers having central reflection wavelengths that are different from each other. This means that, when the light reflecting film of the present invention includes, for example, only one of light reflecting layers PRL-1, PRL-2 and PRL-3, the light reflecting film of the present invention comprises a laminated structure including only one of the light reflecting layers PRL-1, PRL-2 and PRL-3 and least one light reflecting layer selected from a group consisting of other light reflecting layers having central reflection wavelengths which are different from those of the light reflecting layers PRL-1, PRL-2 and PRL-3, and it is necessary for the number of layers of the light reflecting :layers constituting the light reflecting film to be at least two. Further, the reflectance to each ordinary light of each of the light reflecting layers PRL-1, PRL-2 and PRL-3 should be preferably greater than or equal to 10% but less than or equal to 25%, and more preferably greater than or equal to 15% but less than or equal to 20%. Note that, reflectance to ordinary light at the central reflection wavelength of each of the light reflecting layers may either be the same or different, as long as they can be adjusted within the above range.

A central reflection wavelength as used herein means an average wavelength between a wavelength at a short wavelength side and a wavelength at a long wavelength side corresponding to reflectance which is 80% of the maximum reflectance of each light reflecting layer. For example, in a case where PRL-1 has a maximum reflectance of 20%, the central reflection wavelength 2λ can be represented by Equation (1) indicated below:

$$(\lambda 1+\lambda 3)/2=\lambda 2 \quad (1)$$

where

λ1 is a wavelength at the short wavelength side and λ3 is a wavelength at the long wavelength side each corresponding to a reflectance of 16%, which is 80% of the maximum reflectance of 20%.

Further, according to the present invention, as long as one or more of the light reflecting layers PRL-1, PRL-2 and PRL-3 are used, the number of laminated layers of these light reflecting layers can be adjust depending on the width of a reflection band of each of the light reflecting layers. As long as it is possible to reflect a desired proportion of light from an image display unit of a HUD, one of PRL-1, PRL-2 and PRL-3 may be used, or two of them may be laminated, or all the three layers of them may be laminated. Further, when it is desired to adjust the reflection band, the laminated light reflecting layers may include a further light reflecting layer having a central reflection wavelength different from those of the light reflecting layers PRL-1, PRL-2 and PRL-3. However, when converting circularly polarized light into linearly polarized light with a quarter wave plate described below, since it is necessary to be converted into linearly polarized light in the same orientation, each of the laminated light reflecting layers is required to have a property of reflecting polarized light in the same orientation.

With the light reflecting film of the present invention, in a case where the light reflecting layers are cholesteric liquid crystal layers, incident polarized light may be either linearly polarized light or circularly polarized light, but circularly polarized light is preferable. The cholesteric liquid crystal layer may be configured to reflect either right-handed circularly polarized light or left-handed circularly polarized light, and since circularly polarized light does not have any axes, a higher reflectance can be obtained simply and stably by selecting the incident polarized light to be either right-handed circularly polarized light or left-handed circularly polarized light that the light reflecting layer reflects.

Circularly polarized light may be obtained by arranging, for example, a polarizing plate of an absorption type such as a dye-based or iodine-based polarizing plate and a quarter wave plate such that an absorption axis of the polarizing plate or a transmission axis is 45° to a slow axis or a fast axis of the quarter wave plate. According to the present invention, a high reflectance can be obtained if converted into circularly polarized light before reaching the light reflecting layer. Therefore, a polarizing plate and a quarter wave plate may be laminated to provide a so-called circular polarization plate and may be made to be incident on the light reflecting layer, or a quarter wave plate may be laminated with a light reflecting layer and arranged such that the quarter wave plate is located at a polarizing plate-side. A light controlling film of the present invention can be obtained by laminating the light reflecting film and the quarter wave plate described above.

A cholesteric liquid crystal used for the light reflecting layer is a composition composed of a nematic liquid crystal having chirality or a nematic liquid crystal doped with a chiral dopant. It is preferable to obtain a cholesteric liquid crystal by adding a chiral dopant to a nematic liquid crystal, since an orientation of a helix and a reflecting wavelength can be arbitrarily designed depending on the type and amount of the chiral dopant. The nematic liquid crystal employed in the present invention is, unlike a liquid crystal operated by an electric field, used with a helix orientation state being fixed, and thus it is preferable to employ a nematic liquid crystal monomer having a polymerizable group.

A nematic liquid crystal monomer having a polymerizable group is a compound having a polymerizable group in a molecule, and showing liquid crystallinity in a certain temperature range or concentration range. A polymerizable group includes, for example, a (meth)acryloyl group, a vinyl group, a chalconyl group, a cinnamoyl group or an epoxy group. To show liquid crystallinity, it is preferable that there is a mesogen group in a molecule. A mesogen group is, for example, a rod-shaped or plate-shaped substituent such as a biphenyl group, a terphenyl group, a (poly)phenylester benzoate group, a (poly)ether group, a benzylideneaniline group or an acenaphthoquinoxaline group, or a disk-shaped substituent such as a triphenylene group, a phthalocyanine group or an aza-crown group, in other words, a group having an ability to induce a liquid crystal phase behavior. A liquid crystal compound having a rod-shaped or plate-shaped group is known as a calamitic liquid crystal in this technical field. Such a nematic liquid crystal monomer having a polymerizable group may be, specifically, a polymerizable liquid crystal described in Japanese Laid-Open Patent Publication Nos. 2003-315556 and 2004-29824, PALIOCOLOR series (manufactured by BASF) and RMM series (manufactured by Merck). These nematic liquid crystal monomers having a polymerizable group may be used alone or as a mixture of two or more monomers.

The chiral dopant preferably a compound that is capable of inducing a right-handed or a left-handed helical orientation of the nematic liquid crystal monomer having a polymerizable group and that has a polymerizable group similarly to the nematic liquid crystal monomer. Such a chiral dopant may be, for example, Paliocolor LC756 (manufactured by BASF AG), compounds described in Japanese Laid-Open Patent Publication No. 2002-179668. The orientation of the circularly-polarized light to be reflected is determined in accordance with the type of the chiral dopant, and the reflection wavelength of the not reflecting layer can be changed in accordance with an amount of chiral dopant added to the nematic liquid crystal. For example, a light reflecting layer that reflects a wavelength at a shorter wavelength side can be obtained by adding an increased amount of chiral dopant. The amount of chiral dopant to be added differs depending on a type of chiral dopant and a wavelength to be reflected. In order to control the central reflection wavelength 2λ of the light reflecting layer to the ordinary light to a desired wavelength range, the amount of chiral dopant to be added is preferably about 0.5 to 30 parts by weight, more preferably about 1 to 20 parts by weight, and still more preferably about 3 to 10 parts by weight with respect to 100 parts by weight of nematic liquid crystal monomer having an polymerizable group.

Further, it is also possible to add a polymerizable compound that does not have crystallinity and can react with a nematic liquid crystal monomer having a polymerizable groups. Such a compound may be, for example, an ultraviolet curing resin or the like. An ultraviolet curing resin may include, dipentaerythritolhexa(meth)acrylate, a reaction product of dipentaerythritolpenta(meth)acrylate and 1, 6-hexamethylene-di-isocyanate, a reaction product of triisocyanate having an isocyanuric ring and pentaerythritoltri (meth)acrylate, a reaction product of pentaerythritoltri (meth)acrylate and isophorone-di-isocyanate, dipentaerythritolpenta(meth)acrylate, dipentaerythritol tetra (meth)acrylate, pentaerythrifoltetra(meth)acrylate, pentaerythritoltri(meth)acrylate, trimethylolpropanetri(meth) acrylate, ditrimethylolpropanetetra(meth)acrylate, tris(acryloxyethyl)isocyanurate, tris(methacryloxyethyl)isocyanurate, a reaction product of glyceroltriglycidylether and (meth)acrylic acid, caprolactone modified tris(acryloxyethyl)isocyarturate, a reaction product of trimethylolpropanetriglycidylether and (meth)acrylic acid, triglycerol-di-(meth)acrylate, a reaction product of propylene glycol-diglycidylether and (meth)acrylic acid, polypropyleneglycol-di-(meth)acrylate, tripropyleneglycol-di-(meth)acrylate, polyethyleneglycol-di-(meth)acrylate, tetraethyleneglycol-di-(meth)acrylate, triethylenegly col-d (ineth)acrylate, pentaerythritol-di-(meth)acrylate, a reaction product of 1,6-hexanediol-di-glycidylether and (meth)acrylic acid, 1,6-hexanediol-di-(meth)acrylate, glycerol-di-(meth)acrylate, a reaction product of ethyleneglycol-di-glycidylether and (meth)acrylic acid, a reaction product of diethyleneglycol-di-glycidylether and (meth)acrylic acid, bis(acryloxyethyl)hydroxyethylisocyanurate, bis(methacryloxyethyl)hydroxyethylisocyanurate, a reaction product of bisphenol A-diglycidylether and (meth)acrylic acid, tetrahydrofurfuryl (meth)acrylate, caprolactone modified tetrahydrofurfuryl (meth)acrylate, 2-hydroxyethyl(meth)acrylate, 2-hydroxypropyl(meth)acrylate, polypropyleneglycol(meth) acrylate, polyethyleneglycol(meth)acrylate, phenoxyhydroxypropyl(meth)acrylate, acryloylmorpholine, methoxypolyethyleneglycol(meth)acrylate, methoxytetraethylereglycol(meth)acrylate, methoxytriethyleneglycol(meth)acrylate, methoxyethyleneglycol(meth) acrylate, methoxyethyl(meth)acrylate, glycidyl(meth)acrylate, glycerol(meth)acrylate, ethylcarbitol(meth)acrylate, 2-ethoxyethyl(meth)acrylate, N,N-dimethylaminoethyl (meth)acrylate, 2-cyanoethyl(meth)acrylate, a reaction product of butylglycidylether and (meth)acrylic acid, butoxytriethylene glycol(meth)acrylate or butanediolmono (meth)acrylate, and these may be used alone or as a mixture of two or more. Such an ultraviolet curing type resin that does not have liquid crystallinity should be added to such an extent that liquid crystallinity is not lost, and preferably 0.1 to 20 parts by weight, and more preferably about 1.0 to 10 parts by weight with respect to 100 parts by weight of a nematic liquid crystal monomer having a polymerizable group.

In a case where the nematic liquid crystal monomer having a polymerizing group or other polymerizable compounds used in the present invention is of an ultraviolet curing type, a photopolymerization initiator is added to cure a composition including them by ultra-violet rays. The photopolymerization initiator may be, for example, 2-methyl-1-[4-(methylthio)phenyl]-2-morpholinopropane-1 (Irgacure 907 manufactured by BASF AG), 1-hydroxycyclohexylphenylketone (Irgacure 184 manufactured by BASF AG), 4-(2-hydroxyethoxy)-phenyl(2-hydroxy-2-propyl)ketone (Irgacure 2959 manufactured by BASF AG), 1-(4-d odecylphenyl.)-2-hydroxy-2-methylpropane-1-one (DAROCUR 953 manufactured by Merck), 1-(4-isopropylphenyl)-2-hydroxy-2-methylpropane-1 -one (DAROCUR 1116 manufactured by Merck), 2-hydroxy-2-methyl-1-phenylpropane-1-one (Irgacure 1173 manufactured by BASF AG), acetophenone-based compounds such as diethoxy acetophenone, benzoin-based compounds such as benzoin, benzoin methyl ether, benzoin ethyl ether, benzoin iso-propyl ether, benzoin isobutyl ether, 2,2-dimethoxy-2-phenylacetophenone (Irgacure 651 manufactured by BASF AG), benzophenone-based compounds such as benzoyibenzoic acid, methylbenzoylbenzoate, 4-phenyibenzophenone, hydroxybenzophenone, 4-benzoyl-4'-methyldiphenylsulfide, 3,3'-dimethyl-4-methoxybenzophenone (KAYACURE MBP manufactured by Nippon Kayaku Corporation), thioxanthone-based compounds such as thioxanthone, 2-chlor thioxanthone (KAYACURE CTX manufactured by Nippon Kayaku Corporation), 2-methyl thioxanthone, 2,4-dimethyl thioxanthone (KAYACURE RTX), isopropyl thioxanthone, 2,4-dichloro thioxantone (KAYACURE CTX manufactured by Nippon Kayaku Corporation), 2,4-diethyl thioxanthone (KAYACURE DETX manufactured by Nippon Kayaku Corporation.) or 2,4-diisopropyl thioxanthone (KAYACURE DITX manufactured by Nippon Kayaku Corporation). For example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907 or Irgacure 1173 (each manufactured by BASF AG) are preferable, and Irgacure TPO, Irgacure TPO-L, Irgacure OXE01, Irgacure OXE02, Irgacure 907, and Irgacure 1300 are particularly preferable. One of the photopolymerization initiators mentioned above or two or more of the photopolymerization initiators mentioned above may be used by being mixed at any proportion.

In a case where a be nzophenone-ba.sed compound or a thioxanthone-based compound are used as a photopolymerization initiator, an auxiliary agent may be used together to promote a photopolymerization reaction. The auxiliary agent may be, for example, an amine-based compound such as triethanolamine, methyldiethanolamine, triisopropanolamine, n-butylamine, N-methyldiethanolamine, diethylaminoethyl meta acrylate, INlichler's ketone, 4, 4'-diethylaminophenone, 4-dimethyl ethyl aminobenzoate, 4-dimethylaminobenzoic acid (n-butoxy) ethyl or 4-dimethylaminobenzoic acid isoamyl.

The photopolymerization initiator and the auxiliary agent are added by an amount that is preferably within a range that does not affect the liquid crystallinity of the composition including the nematic liquid crystal monomer of the present invention, and the amount is preferably greater than or equal to 0.5 parts by weight but less than or equal to 10 parts by weight, and more preferably about greater than or equal to 2 parts by weight but less than or equal to 8 parts by weight with respect to 100 parts by weight of the UV curing compound in the composition. It is preferable that an amount of the auxiliary agent is about 0.5 times to twice as much as the amount of the photopolymerization initiator.

As a method of manufacturing a light reflecting layer to be used in the light reflecting film of the present invention using the aforementioned cholesteric liquid crystal, a required amount of chiral dopant to induce right-handed or left-handed orientation so as to reflect a desired wavelength is added to, for example, the nematic liquid crystal monomer having a polymerizable group. Then, these are dissolved in a solvent and a photopolymerization initiator is added. Such solvent is preferably cyclopentanone, but is not particularly limited thereto, as long the liquid crystal monomer, the chiral dopant, or the like to be used can be dissolved therein. Subsequently, the solution is applied on a plastic substrate such as a PET film such that the thickness is as uniform as possible, and while removing the solvent by heating, it is let stand for a certain period of time at a temperature condition to become cholesteric liquid crystals on the substrate that are oriented with a desired helical pitch. Before applying, by performing an orientation treatment such as rubbing or stretching a surface of a plastic film, an orientation of the cholesteric liquid crystals can be m.ade more uniform and it becomes possible to reduce a haze value as the light reflecting layer. Then, while maintaining such a state of orientation, an ultraviolet ray is irradiated with a high pressure mercury vapor lamp or the like to fix the orientation to thereby obtain each light reflecting layer used in constituting the light reflecting film of the present invention. Here, in a case where a chiral dopant inducing a right-handed helix orientation is selected, the obtained light reflecting layer selectively reflects right-handed circularly polarized light, and in a case where a chiral dopant inducing a left-handed helix orientation is selected, the obtained light reflecting layer selectively reflects left-handed circularly polarized light. Such a phenomenon of selectively reflecting a specific circularly polarized light is referred to as selective reflection, and a wavelength band which is reflected selectively is referred to as a selective reflection range.

Another method of adjusting reflectance to ordinary light of the light reflecting layer used for the light reflecting film of the present invention includes changing the thickness of the light reflecting layer at the time of manufacture of the light reflecting layer mentioned above. Generally, reflectance increases as the light reflecting layer becomes thicker, but does not become greater than or equal to 50%, which is a theoretical maximum reflectance. Therefore, to make the reflectance to ordinary light in the present invention to be greater than or equal to 5% but less than or equal to 25%, it is preferable that each light reflecting layer has a thickness of less than or equal to about half the thickness corresponding to the theoretical maximum reflectance. Depending on the type of cholesteric liquid crystal and chiral dopant to be used, each light reflecting layer has a thickness of, for example, around 0.1 to 3 μm. If the reflectance to the ordinary light of each light reflecting layer can be adjusted within a desired range, the thickness of each light reflecting layer may be the same or different.

The light reflecting film of the present invention includes one or more of the light reflecting layers PRL-1, PRL-2, and PRL-3, which are manufactured by the method described above. In a case where a half width of each light reflecting layer is wide, a major portion of the visible light range can be covered by including one or two layers among the light reflecting layers PRL-1, PRL-2, and PRL-3, and in a case where a half width of each light reflecting layer is narrow, in order to achieve muiticoloring of the polarized light to be reflected, it is preferable to laminate all three light reflecting layers PRL-1, PRL-2, and PRL-3. The number of laminated layers of the light reflecting layers PRL-1, PRL-2, and PRL-3 may be appropriately adjusted depending on the half width. For example, in a case where the a width is in a narrow range of greater than or equal to 100 nm but less than 200 nm, the light reflecting film is to include all three layers among the light reflecting layers PRL-1, PRL-2, and PRL-3, and in a case where a half width is greater than or equal to 200 nm but less than 500 nm, one or two layers among the light reflecting layers PRL-1, PRL-2, and PRL-3 may be included. Further, in a case where the central reflection wavelengths of the light reflecting layers to be laminated are apart from each other by about 100 to 300 nm, for example, it is designed such that laminated reflection spectra overlap by an appropriate amount that is, for example, greater than or equal to 5%, and preferably greater than or equal to 10% over an entire visible light range, and preferably over an entire wavelength range of 400 nm to 700 nm. Process to laminate the light reflecting layers is not particularly limited, and may include, for example, methods of laminating another light reflecting layer directly on the light reflecting layer or indirectly via an adhesive layer comprising a pressure sensitive adhesive or an adhesive.

Figure 2:
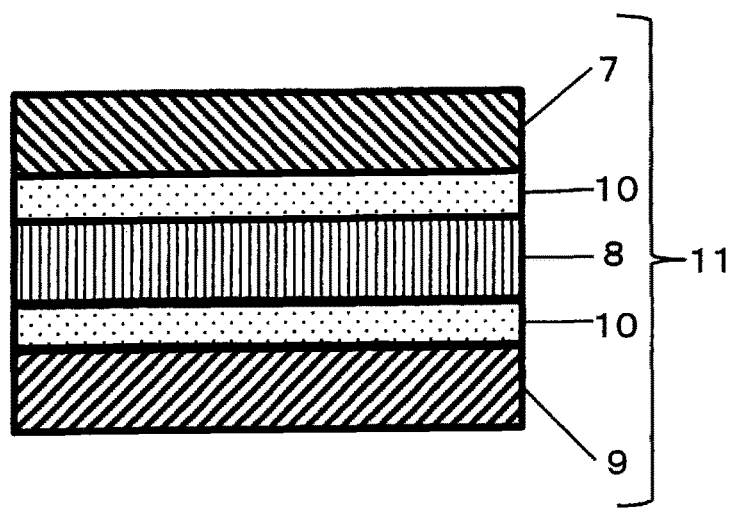
FIG. 2 is a schematic cross-sectional view showing a first embodiment of a light reflecting film according to the present invention.

FIG. 2 shows an exemplary configuration diagram of the light reflecting film of the present invention. The light reflecting film 11 of the present invention can be obtained by laminating light reflecting layers 7, 8 and 9 corresponding to the light reflecting layers PRL-1, PRL-2, and PRL-3, respectively, with adhesive layers 10 comprising an adhesive or a pressure sensitive adhesive. The pressure sensitive adhesive used for the adhesive layer 10 may be a pressure sensitive adhesive of acrylic or rubber based pressure sensitive adhesive, and it is preferable to employ an acrylic pressure sensitive adhesive for which adhesiveness or a holding force is easy to be adjusted. Also, the adhesive used for the adhesive layer 10 may be an Ultraviolet curing type resin composition and a heat curing type resin composition, and mixtures thereof. In the case of an ultraviolet curing type resin, a composition Obtained by mixing a plurality of monomers having an acryloyl group or an epoxy group is irradiated with UV in the presence of a photopolymerization initiator to thereby cure and adhere. In the case of a heat curing type resin composition, a composition obtained by mixing a plurality of monomers having an epoxy group is heated in the presence of an acid catalyst to thereby cure and adhere. Alternatively, a composition composed on a pluralityof monomers or polymers having an amino group, a carboxyl group or a hydroxyl group may be heated in the presence of a compound having an isocyanate group or melamine to thereby cure and adhered.

The reflection wavelength of the light reflecting film of the present invention may vary depending on an angle of incident light. For example, in the case of the light reflecting layer comprising a cholesteric liquid crystal layer, the central reflection wavelength $\lambda 2$ shifts to the short wavelength side as it is tilted from a front direction of the light reflecting layer. At this time, even if the light reflecting layers PRL-1, PRL-2, and PRL-3 shift to the short wavelength side, a color change of the display image can be suppressed if the light reflecting layer that is more to the longer wavelength side than these layers reflects instead of them. In a case where it is largely tilted, a PRL-3 band cannot be reflected, and thus there is a problem that the color of a display image, particularly a red display, becomes faint and cannot be presented with a correct color. In a case where a HUD is performed on an entire face of the automotive windshield, such a phenomenon may occur when viewing an image displayed at a passenger seat side that is most distant from the driver, or at an upper part of the windshield. In such a case, it can be improved by further laminating a light reflecting layer PRL-4 that has a central reflection wavelength of greater than or equal to 700 nm but less than or equal to 950 nm, preferably greater than or equal to 720 nm but less than or equal to 900 nm, more preferably greater than or equal to 730 nm but less than or equal to 900 nm, and still more preferably greater than or equal to 730 nm but less than or equal to 850 nm, as well as a reflectance to the ordinary light in the central reflection wavelength of greater than or equal to 5% but less than or equal to 25%, preferably greater than or equal to 10% but less than or equal to 20%, and more preferably greater than or equal to 15% but less than or equal to 20%, and has a property of reflecting a polarized light that has the same orientation as PRL-1, PRL-2, and PRL-3.

The light reflecting layer PRL-4 as used in the present invention is the same as other light reflecting layers PRL-1, PRL-2, and PRL-3 except that the central reflection wavelength is in a near infrared ray range. The light reflecting layer PRL-4 is transparent in the front direction, since it does not have a reflection field in the visible light range, but by tilting the light reflecting layer PRL-4, the reflection band shifts to the short wavelength side and it becomes possible to reflect in the visible light range. At the same time, by setting the central reflection wavelength to shift to the reflection band of the light reflecting layer PRL-3, an image of the same color as in the front direction can be viewed.

Figure 3:
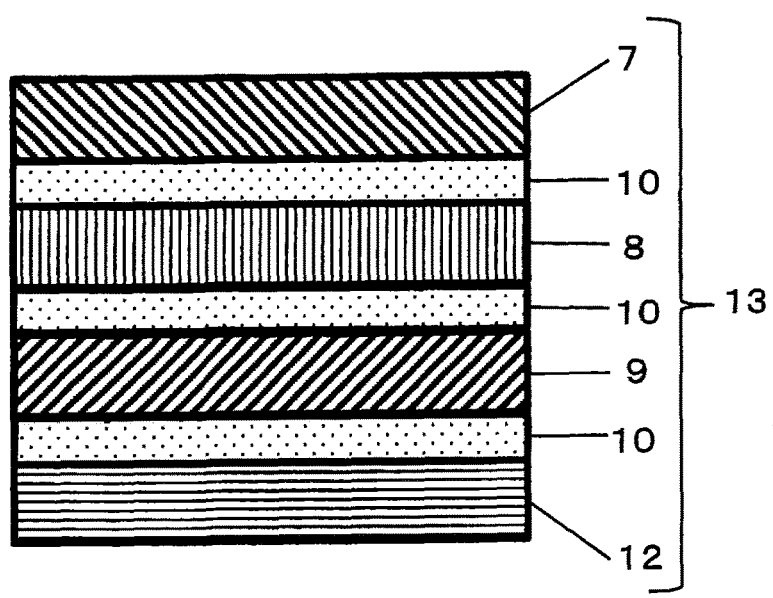
FIG. 3 is a schematic cross-sectional view showing a second embodiment of the light reflecting film according to the present invention.

FIG. 3 shows a configuration of a light reflecting film 13 of the present invention including the light reflecting layer PRL-4. A light reflecting layer 12, which is PRL-4, is laminated with other light reflecting layer 7, 8 or 9 with an adhesive layer 10 being interposed. It is preferable that reflectance to ordinary light at the central reflection wavelength of light reflecting layer PRL-4 is the same as that of other light reflecting layers, particularly PRL-3, and it is preferable that the reflectance is greater than or equal to 5% but less than or equal to 25%, more preferably greater than or equal to 10% but less than or equal to 25%, and still more preferably greater than or equal to 15% but less than or equal to 20%. An orientation of the polarized light should be the same orientation as other light reflecting layers PRL-1, PRL-2 and PRL-3 laminated together, and specifically, the same orientation as the light reflecting layer PRL-3. There is no particular limitation to an order of lamination of the light reflecting layer PRL-4, and the light reflecting layer PRL-4 can be arranged at any position in the thickness direction.

The light reflecting layer PRL-4 as used herein has a reflection band in a near infrared ray range, and thus has a heat shielding effect to sunlight. Therefore, the light reflecting film of the present invention including at least one of the light reflecting layers PRL-1, PRL-2 and PRL-3 as well as the light reflecting layer PRL-4 is capable of, when used in a windshield of the motor vehicle, not only improving the viewability of the projected image in the HUD while having high visible lighttransmittance, but also improving the angle dependency of the display image in the HUD, and further capable of contributing to suppression of an increase in the temperature inside the car by a heat shielding effect. Particularly, in a case where only one of the light reflecting layers PRL-1, PRL-2 and PRL-3 is used, it is preferable to further laminate PRL-4. With a double layered structure including one of the light reflecting layers PRL-1, PRL-2 and PRL-3 and the light reflecting layer PRL-4, it is possible to achieve both a multicolor display and an effect of correction of visible light reflection due to a shift from a near-infrared range with a small number of laminated layers, In order to efficiently reflect light rays of a plurality of wavelengths from a light source with a less number of layers laminated and to suppress a change in reflection band due to a short wavelength shift caused by a tilt, it is preferable that the reflection band of each of the light reflecting layers constituting the light reflecting film of the present invention is wider, and has a half width of preferably greater than or equal to 100 nm but less than or equal to 500 nm, more preferably, greater than or equal to 150 nm but less than or equal to 400 nm, and still more preferably, greater than or equal to 150 nm but less than or equal to 350 nm. With a half width of less than 100 nm, the reflection wavelength will be largely shifted from the wavelength of the light source due to a wavelength shift caused by the tilt. Thus, not only an effect of improving the brightness decreases, but also a correction effect of the visible light reflection by a shift from the near-infrared range, such as PRL-4 described above, tends to be restrictive. Further, it is often difficult to decrease the reflectance while maintaining the half width at less than 100 nm, particularly less than or equal to 50 nm. On the other hand, a half width excessive of 500 nm is not desirable, since reflectance largely decreases, and it becomes difficult to obtain reflectance of greater than or equal to 5%, Also, for example, in a case where the cholesteric liquid crystal of the same material is used in each of the light reflecting layers, there is a tendency that the reflectance decreases as the half width of each of the light reflecting layers becomes broader, and the reflectance increases as the half width becomes narrower. Thus, reflectance of a particular polarized light can be improved more effectively by appropriately adjusting the half width of each of the light reflecting layers. Note that, the half width as used herein means a width of wavelength defined by a wavelength at the long wavelength side and a wavelength at the short wavelength side corresponding to 50% of the maximum reflectance of the light reflecting layer. For example, in a case where the wavelength at the short wavelength side is 450 nm and the wavelength at the long wavelength side is 550 nm corresponding to 50% of the maximum reflectance, the half width is 100 nm. The wavelength corresponding to 50% of the maximum reflectance can be obtained by taking the reflectance derived from selective reflection as a reference, by subtracting an average value (e.g., an average value within 350 nm to 950 nm) of the reflectance of those out of the selective reflection region. For example, in a case where the value of the maximum reflectance of the selective reflection region is 30%, and an average value (a base line of reflectance) of the reflectance of those other than the selection reflectance is 6%, the wavelength corresponding to 50% of the maximum reflectance is a wavelength indicating a reflectance of 18%, which is obtained by subtracting (30-6)/2 from 30%.

Figure 7:
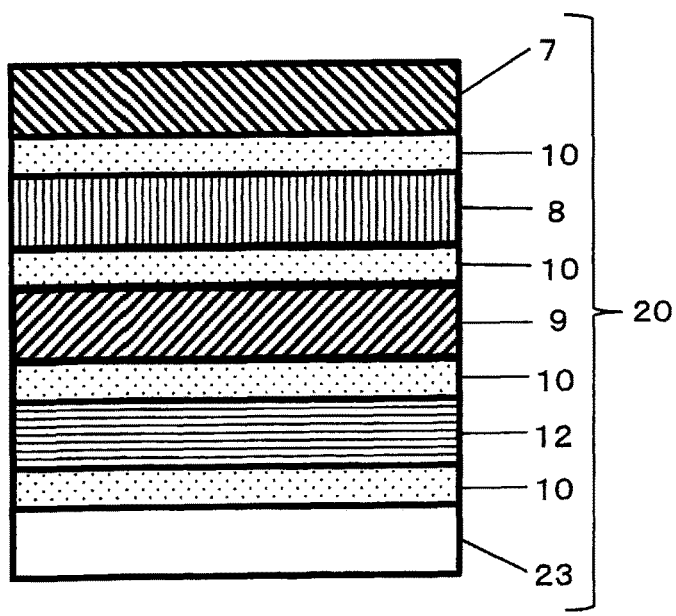
FIG. 7 is a schematic cross-sectional view showing a first embodiment of a light controlling film according to the present invention.

In a case where the light reflecting film of the obtained present invention is inserted into a laminated glass such as a windshield of a motor vehicle and displayed as a HUD, a problem of a so-called ghosting phenomenon (double image) may occur that is such a phenomenon that an image projected on the glass on an interior side of the vehicle and the glass on an exterior side of the vehicle. In order to improve such ghosting phenomenon, it is preferable to use the light controlling film 20 of the present invention including a retardation element laminated, for example, on one side of the light reflecting film of the present invention as shown in FIG. 7, the retardation element being called a quarter wave plate 23 and used as a light controlling layer. A quarter wave plate is a retardation element having a function of converting circularly polarized light into linearly polarized light, and, obtained by, for example, uniaxial stretching of a film comprising polycarbonate or a cycloolefin polymer so that a phase difference becomes quarter of the wavelength, or by orienting a polymeric liquid crystal oriented horizontally with such a thickness that a phase difference becomes quarter of the wavelength. The quarter wave plate may be used alone, or, in a case where the shift in the phase difference due to chromatic dispersion is large, a retardation element called a broad band quarter wave plate may be used. A broad band quarter wave plate is a retardation element having a reduced wavelength dependency of the phase difference, and may be, for example, obtained by laminating a half wave plate and a quarter wave plate having the same chromatic dispersion such that the respective slow axes form an angle of 60 degrees, or a polycarbonate retardation element (manufactured by Teijin Limited: Pure Ace WR-S) with a reduced wavelength dependency of the phase difference. Further, as in the case of a head-up display, when light is incident on the quarter wave plate with an angle of incidence being angled to the quarter wave plate, a phase difference may change depending on an angle of incidence of the light depending the retardation element. In this case, in order to match phase differences more precisely, for example, a change in phase difference in association with an angle of incidence can be suppressed by using a retardation element having a refractive index that is adjusted. As an example, when Nz coefficient is expressed as Equation (2) below:

$$Nz=(nx-nz)/(nx-ny) \quad (2),$$

where
nx is a refractive index in a slow axis direction in-plane of the retardation element,
ny is a refractive index in a direction perpendicular to nx in-plane of the retardation element, and
nz, is a refractive index in a thickness direction.
The Nz coefficient is controlled so as to be preferably 0.3 to 1.0, and snore preferably about 0.5 to 0.8.

Figure 8:
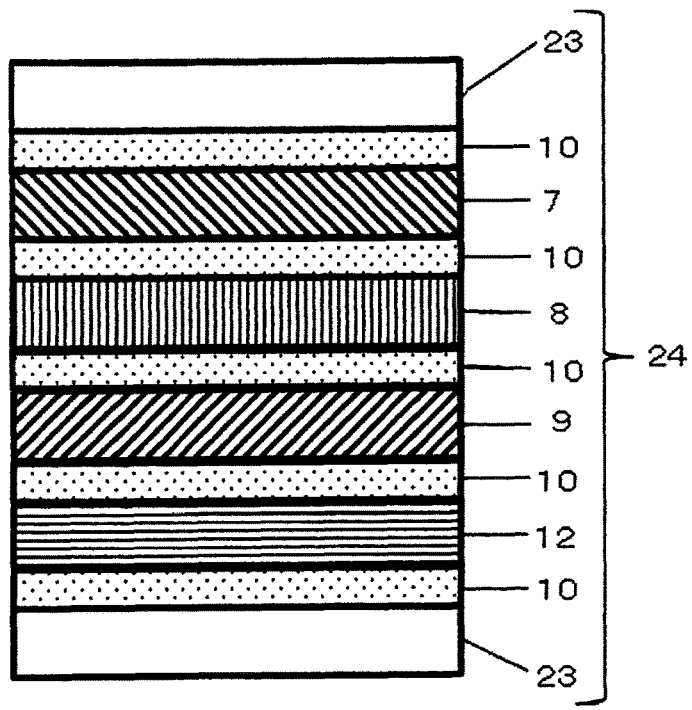
FIG. 8 is a schematic cross-sectional view showing a second embodiment of the light controlling film according to the present invention.

Also, when the slow axis or the fast axis of the retardation film used is at 45 degrees to a longitudinal direction of the quarter wave plate in a roll form, by laminating the quarter wave plate in a roll form and the light reflecting film of the present invention that is similarly in a roll form in a roll-to-roll manner, the light controlling film of the present invention in which the slow axis or the fast axis is at 45 degrees to the longitudinal direction of the roll can be obtained. Further, for example, as shown in FIG. 8, by laminating a quarter wave plate 23, which is another light controlling layer, at a side opposite to the quarter wave plate 23 serving as the light controlling layer laminated at one side of the light reflecting film in FIG. 7 in such a manner that the respective slow axis or fast axis are at right angles, a not controlling film 24 of the present invention can be obtained in which a light reflecting film is interposed between the quarter wave plates 23 with the respective slow axis or fast axis being at right angles. In a case where emitted light from the image display units of the HUD of the present invention is P-polarized light, the slow axis or fast axis of the quarter wave plate should be 45 degrees to the P-polarized light to use a functional glass of the present invention as a windshield of the motor vehicle. When it is laminated such that the slow axis or the fast axis of the quarter wave plate is 0 degrees or 90 degrees to the light reflecting film in a roll form, it must be 45 degrees to the longitudinal direction of the roll when it is cut out in a desired size, many unusable portions will be produced, and reduces the yield. However, as described above, by using the laminating method in which the slow axis or the fast axis of the quarter wave plate is 45 degrees to the longitudinal direction of the roll, a desired size can be cut out in a direction parallel or perpendicular to the longitudinal direction of the light controlling film present invention and thus the yield is largely improved, and the optical film or functional glass of the present invention can be obtained effectively. Herein, the P-polarized light means linearly polarized light wherein the vibration direction of the electric spectrum of the light which is incident on an object such as the light reflecting film, light controlling film, the optical film, and the functional glass of the present invention is in a plane of incidence.

Also, other than laminating a quarter wave plate in a roll form and the light reflecting film of the present invention that is similarly in a roll form in a roll-to-roll manner, a light reflecting layer may be directly laminated on a quarter wave plate. With the light reflecting layer being directly laminated on the quarter wave plate, a light reflecting layer having a low haze value can be obtained without an orientation process such as rubbing. In such a case, considering a good adhesion with the cholesteric liquid crystal and improvement in reflectance to the polarized light, it is particularly desirable to use a quarter wave plate made of polymeric liquid crystals.

Figure 9:
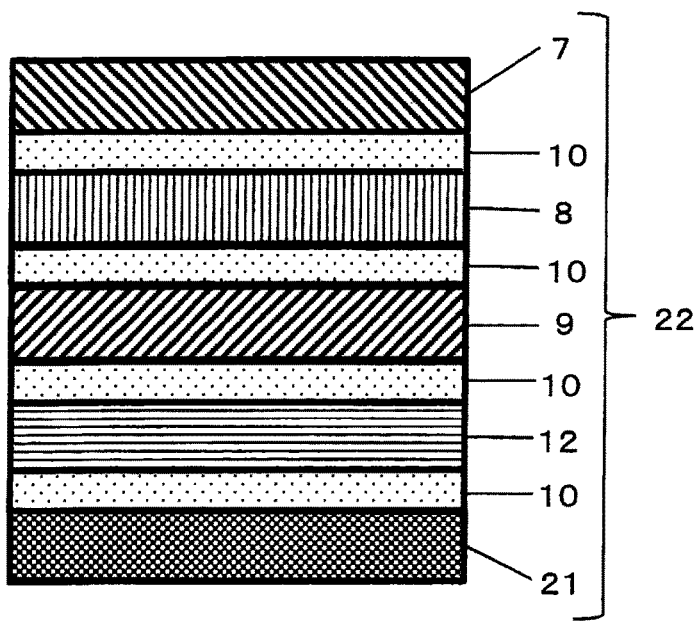
FIG. 9 is a schematic cross-sectional view showing a third embodiment of the light controlling film according to the present invention.

For example, as another method of reducing a ghosting phenomenon, there is a method of using the light controlling film 22 of the present invention further provided with a light absorbing layer 21 as the light controlling layer at one side of the light reflecting film of the present invention as shown in FIG. 9. Light which has penetrated through the laminated light reflecting layers PRL-1, PRL-2 and PRL-3 is absorbed by the light absorbing layer 21 before being reflected on glass, and thus the ghosting phenomenon is reduced. The method of absorbing light includes, but should not be limited to a method in which colorants are mixed into an acryl resin or the like and applied on the light reflecting layer and a method in which a polarizing film is used. In a case where the light absorbing layer is used for a windshield of a motor vehicle, the laminated glass is required to have a transmittance of greater than or equal to 70% under regulations, and thus it is preferable that the light absorbing layer also has a transmittance of greater than or equal to 70% but less than or equal to 90%, and more preferably about greater than or equal to 75% but less than or equal to 85%. When the light controlling film of the present invention including a quarter wave plate or a light absorbing layer newly laminated on the light reflecting layer of the present invention is used for the laminated glass as a windshield of a motor vehicle, ghosting phenomenon can be reduced by using it in such a manner that the quarter wave plate or the light absorbing layer is placed at an exterior side of the motor vehicle. However, in a case where the emitted beam from the image display units is a P-polarized light, when the light controlling film of the present invention is included in laminated glass as a windshield of the motor vehicles, it is desirable to be used in such a manner that the slow axis or the fast axis of the quarter wave plate of the light controlling film is at 45 degrees to the P polarized light such that a projected image in the HUD becomes bright, and in such a manner that the quarter wave plate is placed at an interior side of the vehicle. If an axis arrangement of the quarter wave plate is not satisfactory, an effect of the invention is not exhibited sufficiently. Accordingly, it is preferable to manufacture the laminated glass after having actually projected an image and ensuring an axis arrangement which exhibits an effect of the present invention sufficiently.

Figure 4:
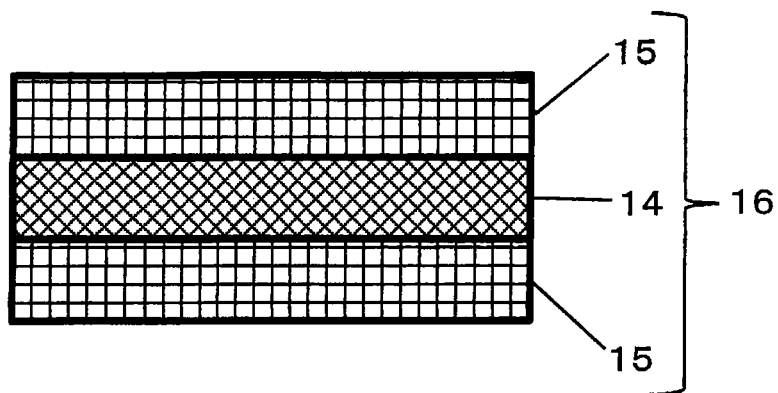
FIG. 4 is a schematic cross-sectional view showing an embodiment ofan optical film according to the present invention.

The optical film of the present invention can be obtained by laminating the light reflecting film or the light controlling film of the present invention thus obtained with two intermediate films. FIG. 4 shows an example of the optical film of the present invention. The optical film 16 has a configuration in which the light reflecting film or light controlling film 14 is interposed between two intermediate films 15. The light reflecting film 14 corresponds to, for example, the light reflecting film 11 of FIG. 2 or the light reflecting film 13 of FIG. 3. The light controlling film 14 corresponds to, for example, the light controlling film 20 of FIG. 7, the light controlling film 24 of FIG. 8, or the light controlling film 22 of FIG. 9. As the intermediate film, polyvinylbutyral-based resin (PVB) or ethylene-vinyl acetate copolymerized resin (EVA) can be used. These are preferable since these are versatile as an intermediate film for laminated glass, but not particularly limited thereto as long as the quality as the laminated glass can meet the needs.

The intermediate film may contain an UV absorber, an anti-oxidant, an antistatic agent, a heat stabilizer, a coloring agent, an adhesion moderator, or the like that is appropriately add thereto. Specifically, an intermediate film in which fine particles absorbing infrared radiation are dispersed is of importance in terms of producing a high-performance heat shielding laminated glass. Fine particles absorbing infrared radiation may be ultrafine particles of a material having conductivity such as metals, metal oxides and nitrides of Sn, Ti, Zn, Fe, Al, Co, Ce, Cs, In, Ni, Ag, Cu, Pt, Mn, Ta, W, V and Mo, these individual materials doped with Sb or F, and also complexes containing two or more of these. In particular, tin-doped oxide indium (ITO), antimony-doped tin oxide (ATO) and fluorine doped tin oxide, which are transparent in the visible light range, are particularly preferable for use in windows of buildings or motor vehicles, where transparency is particularly required. The fine particles absorbing infrared-rays to be dispersed in the intermediate film has a particle size of preferably less than or equal to 0.2 μm. With this size, infrared-rays can be absorbed while suppressing the scattering of light in the visible light range. Thus, while producing no haze and maintaining electric wave penetrability and transparency, physical properties such as adhesiveness, penetrability, and durability can be maintained equivalent to those in the case of an intermediate film with no additives. Further, a laminated glass producing process can be performed with processes on a normal laminated glass production line. In a case where PVB is used for an intermediate film, a lamination process is carried out in a room at constant temperature and constant humidity to maintain the moisture content of the intermediate film optimum. Further, the intermediate film may also be an intermediate film with a part thereof being colored, an intermediate film with a layer having a sound isolating function sandwiched therein, or an intermediate film with an inclination in the film thickness (wedge-shaped) to reduce the ghosting phenomenon (double image) in the HUD.

A method of laminating the light reflecting film or the light film with an intermediate film is not particularly limited, but may be, for example, a method of laminating an intermediate film, the light reflecting film or the light controlling film, and an intermediate film simultaneously by pressure bonding using a nip roll. In a case where a nip roll can be heated while laminating, it is possible to perform pressure bonding while heating. In a case where adhesion between the intermediate film and the light reflecting film is poor, a surface treatment such as corona treatment or plasma treatment may be performed prior to carrying out lamination.

A functional glass of the present invention can be obtained by combining the light reflecting film, the light controlling film or the optical film of the present invention with glass. The light reflecting film, the light controlling film or the optical film of the present invention is bonded with glass by applying a pressure sensitive adhesive or an adhesive to one side or both sides of the light reflecting film, the light controlling film or the optical film, and then bonding with a glass sheet. The pressure sensitive adhesive or the adhesive is not particularly limited, but if there is a case where it is peeled off later, a pressure sensitive adhesiveness having good reworkability is desirable, and for example, a silicone pressure sensitive adhesive or an acrylic pressure sensitive adhesive is preferable.

Figure 5:
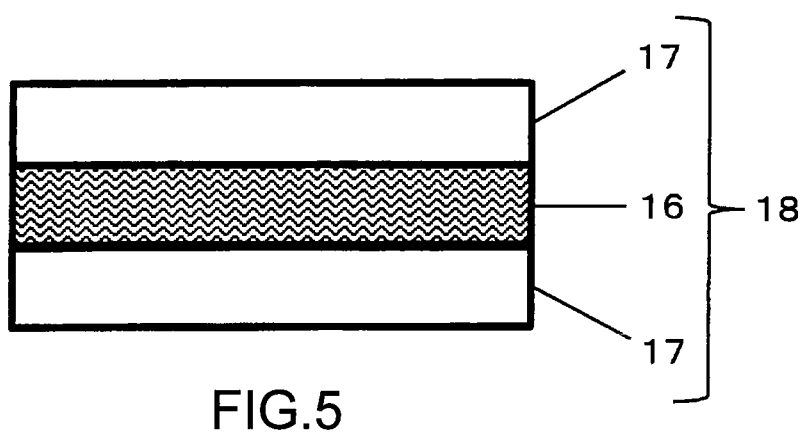
FIG. 5 is a schematic cross-sectional view showing an embodiment of a functional glass according to the present invention.

When employing the optical film of the present invention, a functional glass of the present invention including an optical film disposed in a laminated glass can be obtained by placing the optical film between two glass sheets and carrying out pressure bonding at high temperature and high pressure. FIG. 5 shows an example of the functional glass of the present invention. A functional glass 18 shown in FIG. 5 has a configuration in which an optical film 16 is interposed between two glass sheets 17. Here, the intermediate films 15 of the optical film 16 between which the light reflecting film or light controlling film 14 is interposed also have a function as a pressure sensitive adhesive or an adhesive for keeping adhesiveness between the glass 17 and the light reflecting film.

An exemplary method of manufacturing the functional glass of the present invention using the optical film 16 will be described in detail. First, two glass sheets are prepared. When used as a laminated glass for a windshield of a motor vehicle, soda-lime glass produced by a float process is used. Glass may either be transparent or green colored, but not particularly limited thereto. Usually, those glass sheets having a thickness of about 2 mmt is used, but in order to meet recent needs for light weighted glass, glass sheets having a slightly smaller thickness than this may be used. The glass sheet is cut into a predetermined shape, and glass edges are chamfered and washed. In a case where black prints in a frame shape or dotted shape are required, these are printed on the glass sheet. In a case where a curved surface is required, such as for a windshield, the glass sheets are heated to 650° C. or above, and thereafter, they are shaped to have the same surface shape by pressing with a mold or bending under their own weight, and then the glasses are cooled. Here, if a cooling rate is too rapid, stress distribution is produced in the glass sheet and it becomes a tempered glass, and thus cooling is carried out gradually. One of the glass sheets manufactured in this manner is placed horizontally and, thereon, the optical film of the present invention is laminated and further the other glass sheet is placed. Alternatively, it may be a method in which, on the glass sheet, the intermediate film, the light reflecting film or the light controlling film of the present invention, and the intermediate film are sequentially laminated and finally, the other glass sheet is placed. Here, in a case where the light controlling film of the present invention is employed, the quarter wave plate or the light absorbing layer as the light controlling layer is placed so as to be at an exterior side of the vehicle. Then, the optical film, the intermediate film, and the light reflecting film protruding from edges of the glass are cut away with a cutter. Thereafter, heating is carried out to bring to a temperature of 80° C. to 100° C. while deaerating air present between the glass, the intermediate film, the light reflecting film or the light controlling film laminated into a sandwich form and preliminary bonding is carried out. There are two methods of performing deaeration, and either of these methods may be used. One is a bag method performed by wrapping a laminate of glass/intermediate film/light reflecting film or the light controlling film/intermediate film/glass in a rubber bag made of heat-resisting rubber or the like. The other is a ring method in which only an end portion of the glass is covered with a rubber ring. After the preliminary bonding, the laminate of glass/intermediate film/light reflecting film or the light controlling film/intermediate film/glass that is removed from the rubber bag and the laminate from which the rubber band is removed is placed in an autoclave and heated to 120° C. to 150° C. under a high pressure of 10 to 15 kg/cm$^2$ and a heating and pressurizing process is performed under this condition for 20 minutes to 40 minutes. After processing, it is cooled to 50° C. or below, and depressurized, and then functional glass of the present invention comprising glass/intermediate film/light reflecting film or light controlling film/intermediate film/glass is removed from the autoclave.

The functional glass of the present invention thus obtained can be used as a windshield, a side glass, a rear glass or a roof glass of an ordinary motor vehicle, a small motor vehicle, a light-weighted motor vehicle, as well as, a large-sized special motor vehicle, a small-sized special motor vehicle. Further, it can be also used for a window of a. railway carriages, boats, or aircrafts, as well as a window material for building material use and industrial use. .As to the mode of use, it may be laminated or bonded to a component having a UV shielding or light modulating function.

Figure 6:
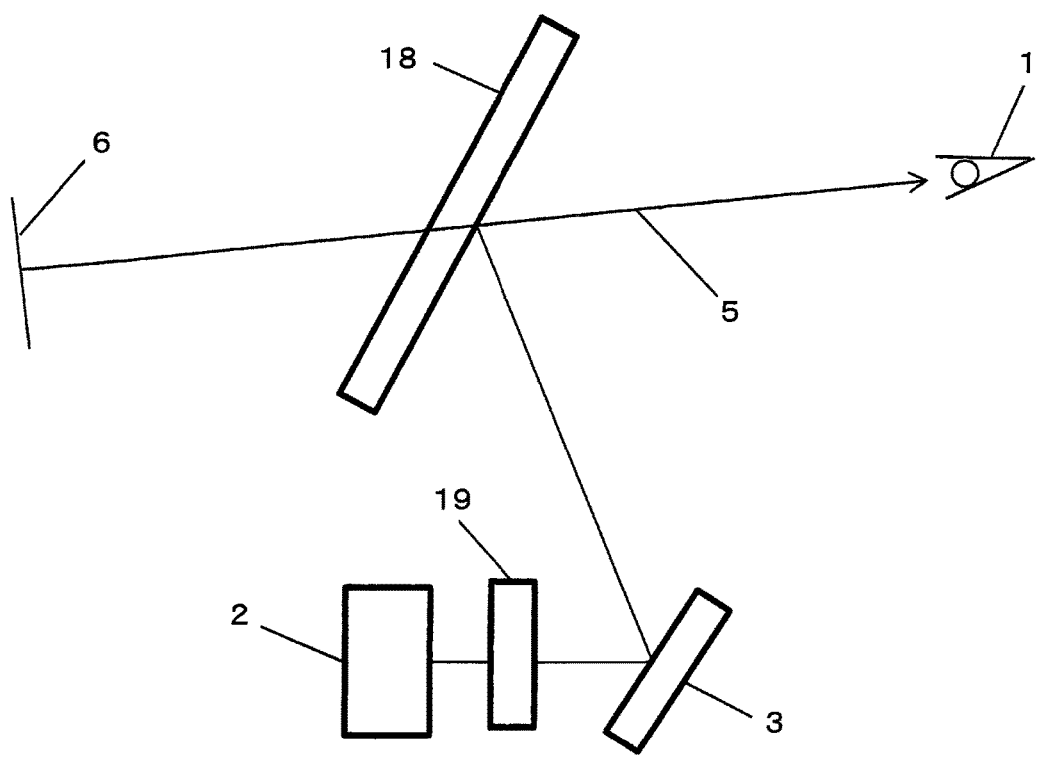
FIG. 6 is a schematic diagram showing an embodiment of a head-up display according to the present invention.

Further, the head-up display (HUD) of the present invention can be obtained by replacing the functional glass 18 of the present invention with the windshield 4 of FIG. 1, or bonding the light reflecting film or the light controlling film of the present invention on the vehicle interior side glass of the windshield. When the light reflecting layer comprises a cholesteric liquid crystal layer, an effect of the invention can be obtained by making linearly polarized light or circularly polarized light to be emitted from the image display units 2 in FIG. 6, and particularly, higher reflectance can be obtained for circularly polarized light. In a case where the functional glass 18 of the present invention comprises a light reflecting layer that is a cholesteric liquid crystal layer, and light emitted from the image display units 2 is linearly polarized light, as shown in FIG. 6, a circularly-polarized emitting units includes, specifically, a quarter wave plate 19 disposed between the image display units 2 and the reflective mirror 3, or between the reflective mirror 3 and the functional glass 18, or between the light reflecting layer and the intermediate film. at the interior side of the vehicle, and further setting the fast axis or the slow axis of the quarter wave plate 19 with respect to the polarizing axis of the linearly polarized light so as to be circularly polarized light in the same orientation as the circularly polarized light that the cholesteric liquid crystal layer, which is the light reflecting layer, reflects. Thus, light emitted from the image display units 2 becomes circularly polarized light before arriving at the functional glass 18 of the present invention, and reaches the observer 1 by being reflected by the cholesteric liquid crystal layer in the functional glass.

The effect of the invention is not limited to the above configuration. For example, the functional glass of the present invention is manufactured by employing the light controlling film) the present invention in which the quarter wave plate as the light controlling layer and the light reflecting layer of the present invention are laminated such that the quarter wave plate is at an interior side of the vehicle, and also, such that the slow axis or the fast axis of the quarter wave plate is disposed at 45 degrees with respect to P polarized light, which is an orientation at which a projected image of the HUD is bright. Now, if emitted light from the image display units is P polarized fight, and further projected by being incident on the functional glass of the present invention near Brewster's angle, reflection at the glass at an interior side of the vehicle is largely reduced, and transmitted light becomes circularly polarized light at the quarter wave plate and reflects on the light reflecting layer, and it becomes P polarized light again at the quarter wave plate, and a bright image can be projected to the observer. When the functional glass of the present invention is used in the above configuration, the ghosting phenomenon which occurs when a projected image of the BUD is viewed can be greatly reduced. Further, by viewing the projected image through polarized sunglasses, the ghosting phenomenon can be made to almost disappear, while maintaining high viewability of the projected image. An ordinary HUD system has low reflectance to P polarized light, and thus S-polarized light is used. Also, since reflection of the road surface is S-polarized light, polarized sunglasses are designed to have a polarization axis capable of absorbing S-polarized light. Therefore, when a projected image of an ordinary HUD is observed through polarized sunglasses, viewability of the projected image extremely decreases. Whereas, with a HUD having improved reflectance of P polarized light as described above manufactured by utilizing the light controlling film of the present invention, namely, a HUD utilizing the P polarized light, extremely advantageous effects can be obtained such as improved viewability of the projected image of the HUD and a decrease in the ghosting phenomenon, and even if viewed through polarized sunglasses, viewability of the projected image is high and the ghosting phenomenon can be almost eliminated.

Further, when the light reflecting film in the functional glass of the present invention further includes a light reflecting layer PRL-4 that reflects a near infrared range, angle dependency of the HUD is canceled. Since the PRL-4 shifts the reflection wavelength range from a near infrared range to a red range of the visible light, even if an Observer observes a windshield from an oblique direction, a displayed color, which is same as the front direction, can be seen. Further, the light reflecting layer PRL-4 has a heat shielding effect, and thus it is capable of contributing to temperature rise control inside the motor vehicle due to incident sunlight.

In a case where the light controlling film of the present invention is disposed such that the quarter wave plate is laminated as the light controlling layer at a vehicle exterior side of the light reflecting layer, the circularly polarized light, which has transmitted through the light reflecting layer, is converted into linearly polarized light by the quarter wave plate. At this time, by adjusting the slow axis or the fast axis of the quarter wave plate such that the linearly polarized light is converted into P polarized light, and further adjusting an optical path such that an angle of incidence to the glass at a vehicle exterior side is at or near Brewster's angle, reflectance at the glass at the vehicle exterior side of can be largely reduced, and the ghosting phenomenon is improved. At this time, in a case where, as a unit for converting the incident light into circularly polarized light, the quarter wave plate is disposed as the light controlling layer between the light reflecting layer and the intermediate film at the vehicle interior side, the configuration is such that the light reflecting layer is interposed between two quarter wave plates. This is also an embodiment of the light controlling film of the present invention. At this time, it is preferable that the slow axes of the two quarter wave plates are disposed at right angles, and more preferably the slow axes of the two quarter wave plates are disposed at right angles and at 45 degrees to an incident P polarized light. With such an arrangement, for example, when the projected light is P polarized light and further incident on the laminated glass of the present invention at or near the Brewster's angle, reflection on the glass at the vehicle interior side is largely reduced, and light which has transmitted through the glass at the vehicle interior side is made into a circularly polarized light at the quarter wave plate, and reflects off the light reflecting layer, and it is made into P polarized light at the quarter wave plate again, and a bright image can be projected to the observer. Further, the light which has passed through the light reflecting layer becomes the P polarized light by the quarter wave plate at the vehicle exterior side, and, similarly to the vehicle interior side, since it is near the Brewster's angle, reflection at the vehicle exterior side glass can be greatly reduced. It is particularly desirable, since the ghosting phenomenon occurring at each of the vehicle interior side and the vehicle exterior side of the laminated glass is unproved, and can improve the viewability of the projected image. As described above, it is preferable that light observed is circularly polarized light or P polarized light, since the projected image can be prevented from being darkened even if viewed through polarized sunglasses, and P polarized light is further preferable.

According to the light controlling film of the present invention, in a case where the light absorbing layer is used as the light controlling layer, since the light absorbing layer is placed at the vehicle exterior side of the light reflecting layer, light which has passed through the light reflecting layer is absorbed in this light absorbing layer, and is not reflected by glass at the vehicle exterior side or there is only an extremely slight reflection, the ghosting phenomenon can be improved. Note that it is also possible to use together with the quarter wave plate on which a light absorbing layer is laminated with the light reflecting layer such that the light absorbing layer is at the vehicle interior side of the light reflecting layer, and, for example, by matching the absorption axis of the polarizing plate with the polarizing axis of the P polarized light to absorb the linearly polarized light that has become P polarized light by the quarter wave plate, and placing the light absorbing layer more to the vehicle exterior side of the quarter wave plate and inside of the glass at the vehicle exterior side, the ghosting phenomenon can be further reduced. Other than the configuration in which the light reflecting film is interposed between the quarter wave plate and the light absorbing layer in this manner, a configuration in which a light absorbing layer is further provided at one side of the light controlling film interposed between the quarter wave plates is also mode of the light controlling film of the present invention. By manufacturing a laminated glass and a HUD by disposing the light absorbing layers of those light controlling films such that they are at the vehicle exterior side, the ghosting phenomenon improving effect due to the P polarized light incident from the aforementioned near Brewster's angle and an effect of absorption of the transmitted light by the light absorbing layer are obtained, and thus the ghosting phenomenon can be further reduced.

An image display units used in the HUD of the present invention may be a liquid crystal display apparatus (LCD), an organic electroluminescence display, or the like, but not particularly limited thereto, as long as desired polarized light is obtained before finally arriving at the functional glass. In a case where the image display apparatus is a liquid crystal display apparatus, emitted light is usually linearly polarized light, and thus, can be used as it is, or can be converted into circularly polarized light by placing a quarter wave plate 19 as shown in FIG. 6. Alternatively, for example, in the case of motor vehicles, it is possible to adjust into an optimum polarized light by placing a polarizing plate, a circularly polarizing plate, or a quarter wave plate at a light emitting opening such as a car dashboard. In the case of organic electroluminescence, a polarizing plate may be placed between the quarter wave plate 19 and the image display units 2. Alternatively, similarly to the aforementioned liquid crystal display, it is possible to adjust into an optimum polarized light by placing a polarizing plate, a circularly polarizing plate, or a quarter wave plate at a light emitting opening. Further, a light source to be used may be a laser light source, a LED light source or the like, but not particularly limited thereto. The light reflecting layer as used herein may be configured to have a central reflection wavelength corresponding to emission spectra of these light sources to thereby more effectively project a display image brightly.

EXAMPLES

Hereinafter, the present invention will be exemplified in detail by examples. In examples, "parts" means "parts by weight".

Preparation of Coating Solutions (Liquid Crystal Composition)

Coating Solutions (R1), (R2), (R3) and (R4) having compositions shown in the following tables were prepared, respectively.

Composition Table of Coating Solution (R1)

TABLE 1

Composition Table of Coating Solution (R1)

| Material (Type) | Material Name (Name of Manufacturer) | Amount (parts) |
|---|---|---|
| Polymerizable Liquid Crystal Monomer | LC242 (BASF) | 20.00 |
| Chiral Dopant | LC756 (BASF) | 1.54 |
| Photopolymerization Initiator | Irgacure TPO (BASF) | 1.00 |
| Solvent | Cyclopentanone | 80.00 |

Next, coating solutions (R2), (R3) and (R4) were prepared with similar formulae except that the amount of the chiral dopant in the coating solution (R1) was replaced with quantities shown in the table below.

TABLE 2

Content of Chiral Dopant for Coating Solutions (R2) to (R4)

| Coating Solution | Amount of Chiral Dopant (parts) |
|---|---|
| Coating Solution (R2) | 1.26 |
| Coating Solution (R3) | 1.04 |
| Coating Solution (R4) | 0.70 |

Example 1

<Production of a Light Reflecting Film>

Using the coating solutions (R1), (R2) and (R3) thus prepared, light reflecting layers PRL-1, PRL-2, and PRL-3 were produced respectively with the following procedure. Subsequently, these were laminated to obtain the light reflecting film of the present invention. As a plastic substrate, a PET film (product name A4100, thickness 50 μm), manufactured by Toyobo Co., Ltd. was used, which has been subjected to a rubbing process in advance by a method described in Example 1 of Japanese Laid-Open Patent Publication No. 2002-90743 at a surface with no undercoat layer.

(1) Using a wire bar, each of the coating solutions was applied to a rubbed surface of each of the PET films at room temperature such that each of light reflecting layers obtained after drying has a thickness of 0.5 μm.

(2) Each coated layer was heated at 150° C. for five minutes to remove the solvent and made into a cholesteric liquid-crystalline phase. Then, UV irradiation was carried out with an output power of 120 W for 5 to 10 seconds using a high pressure mercury lamp (manufactured by Harison Toshiba Lighting Corp.) to fix the cholesteric liquid-crystalline phase to obtain a light reflecting layer on a PET film.

(3) The light reflecting layer PRL -1 (the coating solution (R1) being used) and the light reflecting layer PRL-2 (the coating solution (R2) being used) on the PET films produced as in (1) to (2) were laminated with each other at light reflecting layer sides thereof using an acrylic pressure sensitive adhesive (manufactured by Soken Chemical & Engineering Co., Ltd., acrylic pressure sensitive adhesive SK Dyne 906).

(4) The PET film of the light reflecting layer PRL-2 was peeled off.

(5) The light reflecting layer side of the light reflecting layer PRL-3 (the coating solution (R3) being used) on the PET film produced in a similar manner as in (1) and (2) and the light reflecting layer side of the light reflecting layer PRL-2 from which the PET film is peeled off as in (4) were laminated with each other using the same acrylic pressure sensitive adhesive same as in (3).

(6) Finally, the PET films at both outer sides of the light reflecting layers PRL-1 and PRL-3 that are laminated were peeled off.

Figure 10:
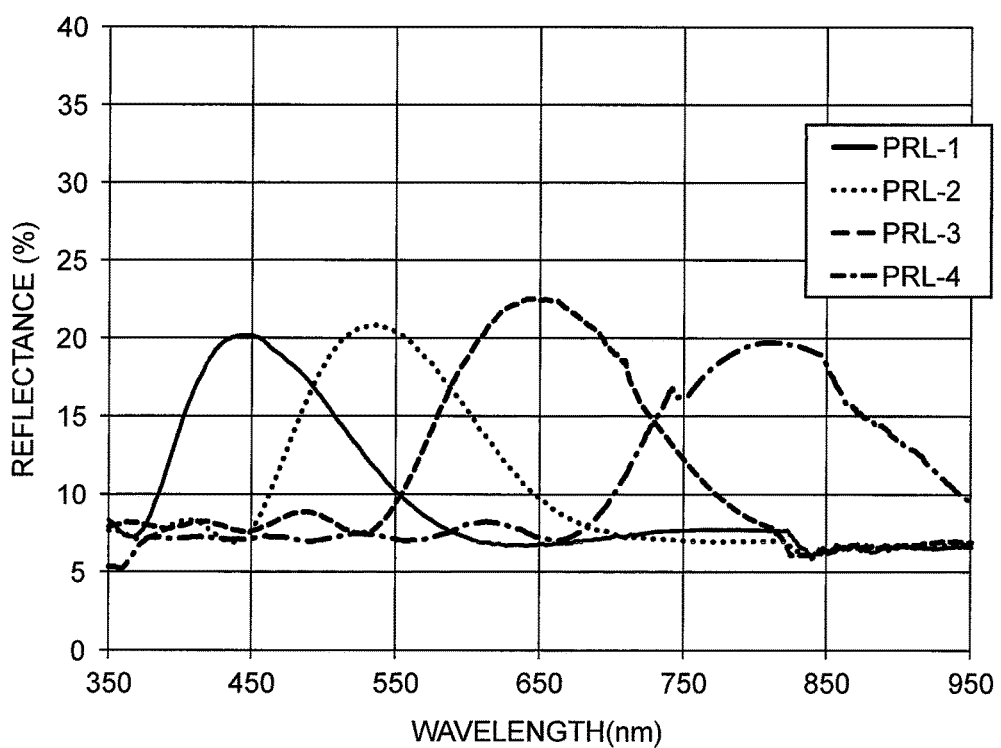
FIG. 10 a graph showing reflection characteristics of light reflecting layers, respectively.

In this manner, the light reflecting film of the present invention comprising three layers laminated in an order of the light reflecting layer PRL-1, the light reflecting layer PRL-2, and the light reflecting layer PRL-3 and having a thickness of 1.5 μm was obtained. FIG. 10 is a plot showing a relationship between the wavelength and the reflectance for a case where each of the light reflecting layers PRL-1, PRL-2, PRL-3, and PRL-4 was formed as a single layer. As can be seen in FIG. 10 and Table 3 below, the central reflection wavelengths of the light reflecting layers PRL-1, PRL-2, and PRL-3 were 450 nm (half width 123 nm), 540 nm (half width 131 nm), and 650 nm (half width 148 nm), respectively, and the reflectances at the central reflection wavelengths of the light reflecting layers PRL-1, PRL-2, and PRL-3 were approximately 20%, approximately 21%, and approximately 22%, respectively.

TABLE 3

Reflection Property of Light Reflecting Layers in FIG. 10

|  | Light Reflecting Layer | | | |
| --- | --- | --- | --- | --- |
|  | PRL-1 | PRL-2 | PRL-3 | PRL-4 |
| Maximum Reflectance (%) | 20.2 | 20.8 | 22.4 | 19.6 |
| Central Reflection Wavelength λ2 (nm) | 450 | 540 | 650 | 800 |
| 50% Short Wavelength-Side Wavelength (nm) | 397 | 479 | 578 | 722 |
| 50% Long Wavelength-Side Wavelength (nm) | 520 | 610 | 726 | 900 |
| Half Width (nm) | 123 | 131 | 148 | 178 |

*Baseline of Reflectance of Each Light Reflecting Layer: Approx. 7%

Figure 11:
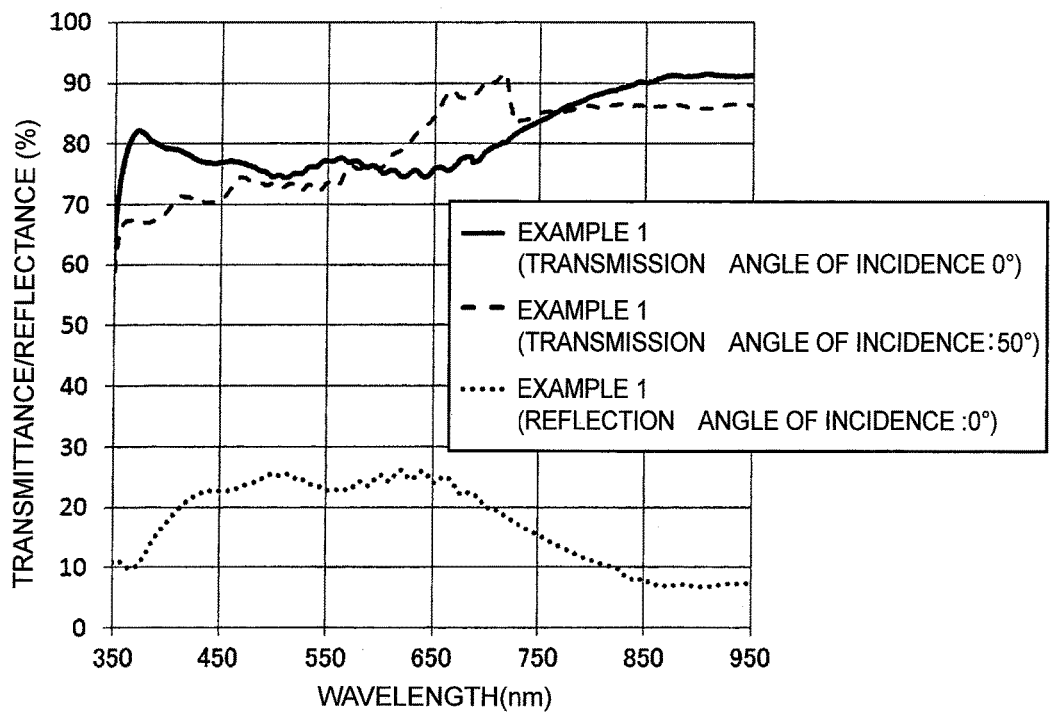
FIG. 11 is a graph showing spectral characteristics of a light reflecting film of Example 1.

FIG. 11 shows spectral characteristics of transmittance and reflectance of the obtained light reflecting film. An average transmittance of the visible light in a front direction of the light reflecting film was approximately 77%, and around 550 rim where the spectral luminous efficacy is generally high, the reflectance was approximately 23%. On the other hand, when the obtained light reflecting film was viewed from a position that is 50° tilted from the front, transmittance of the red range (near 650 nm) has increased and the color became different from that of the front direction.

<Production of an Optical Film>

Using two transparent polyvinylbutyral intermediate films having a thickness of 0.38 man, the optical film of the present invention was obtained by placing the aforementioned light reflecting film of the present invention between the polyvinylbutyral films and subsequently pressure bonding with a laminator.

<Production of a Functional Glass>

The functional glass of the present invention was obtained by placing the aforementioned optical film between two glass sheets each having a thickness of 2 mm, and subsequently applying pressure and heat. First, the optical film of the present invention and a transparent glass sheet were superposed on a transparent glass sheet. Then, an extra portion of the optical film protruding from an edge portion of the glass sheet was cut and removed. This was wrapped in a rubber bag and deaerated for ten minutes in an autoclave heated to 90° C., and preliminary bonded. This was cooled to room temperature, and thereafter removed from the rubber bag, placed in the autoclave again, and heat and pressure were applied at 135° C. under a high pressure of 12 kg/cm² for 30 minutes. Thus, the functional glass of the present invention having the optical film of the present invention inserted therein and having a good appearance was manufactured. The obtained functional glass of the present invention had a visible light transmittance of 72%.

<Manufacture of a Head-up Display and Evaluation of a Display Image>

A head-up display was manufactured with an arrangement as shown in FIG. 6. Note that a liquid crystal projector was used as the image display units 2, a broad band quarter wave plate (manufactured by Teijin Corporation: Pure Ace WR-S) was used as the quarter wave plate 19, a commercially available mirror was used as the reflective mirror 3, and the laminated glass produced as described above was used as the functional glass 18. Subsequently, in a darkroom, in a case where an image was projected from the liquid crystal projector to the functional glass, the display image was extremely brightly and clearly projected. On the other hand, in a case where the observation position was tilted in a diagonal direction (approximately 50 degrees from the front direction), the red display of the display image was slightly unclear.

Example 2

A light reflecting layer PRL-4 (the coating solution (R4) being used) was obtained on a PET film by a production method similar to Example 1, except that the coating solution (R4) was used. The light reflecting film of the present invention comprising four layers, which are the light reflecting layer PRL-1, the light reflecting layer PRL-2, the light reflecting layer PRL-3, and light reflecting layer PRL-4 laminated in this order, was obtained by: peeling off the PET film at the light reflecting layer PRL-3 side of the light reflecting film obtained by (1) to (5) Example 1; laminating, using acrylic pressure sensitive adhesive, the light reflecting layer side of the light reflecting layer PRL-4 on the PET film and the light reflecting layer side of the light reflecting layer PRL-3 from which the PET film was peeled off with each other; and subsequently, peeling off the PET films at both outer sides of the light reflecting layer PRL-1 and the light reflecting layer PRL-4. that are laminated. As can be seen in FIG. 10 and Table 3, the central reflection wavelength of the light reflecting layer PRL-4 was 800 nm (half width 178 nm) and the reflectance at the central reflection wavelength of the light reflecting layer PRL-4 was approximately 20%.

Figure 12:
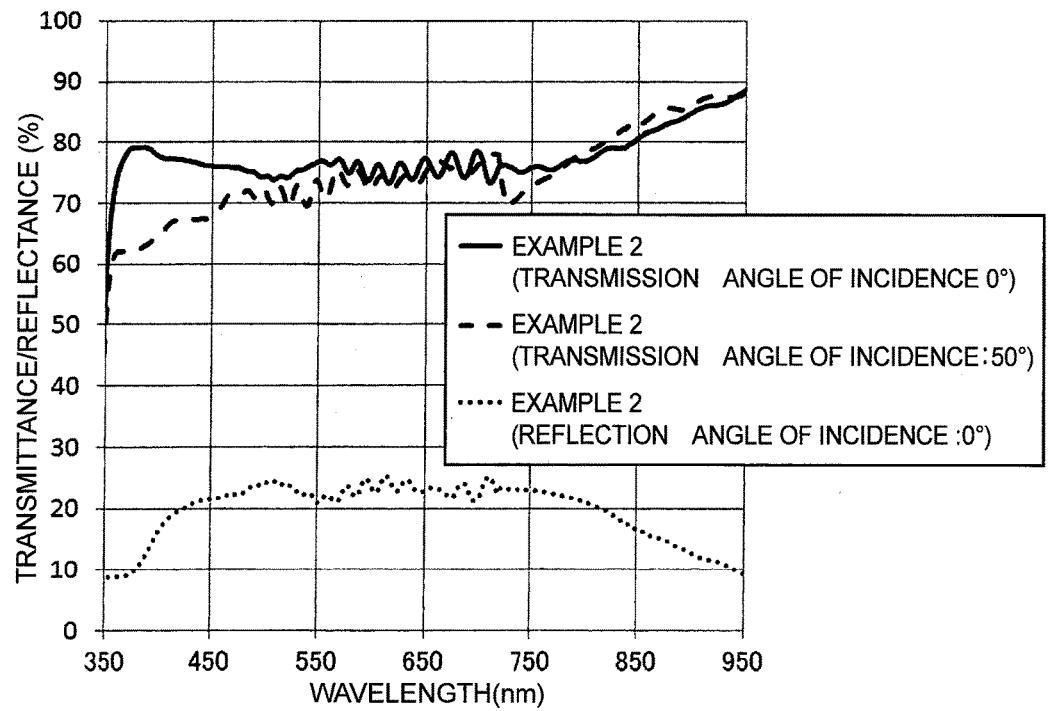
FIG. 12 is a graph showing spectral characteristics of a light reflecting film of Example 2.

FIG. 12 shows spectral characteristics of transmittance and reflectance of the obtained light reflecting film. Average transmittance of the visible light in the front direction of the light reflecting film was approximately 77%, and the reflectance around 550 nm was approximately 22%. Also, even if the obtained light reflecting film was viewed from a position that is 50° tilted from the front, there was no change in the transmittance in the red range and the color was similar to the color in the front direction.

Also, with a production method similar to Example 1, the optical film of the present invention was obtained by interposing between two polyvinylbutyral intermediate films. Further, with a production method similar to Example 1, the optical film of the present invention was interposed between two glass sheets to form a laminated glass to thus obtain the functional glass of the present invention. The obtained functional glass of the present invention had a visible light transmittance of 72%. Then, a HUD was manufactured with a production method similar to Example 1, and when similar evaluation was carried out, a display image in the front direction was extremely bright and clear. Also, even if an observation position was tilted in an oblique direction (approximately 50 degrees from the front direction), there was no change in the color of the display image and was clear as in the front direction.

Example 3

At the light reflecting layer PRL-4 side of the light reflecting film obtained in Example 2, a broad band quarter wave plate (manufactured by Teijin Corporation: Pure Ace WR-S) serving as a light controlling layer was bonded with a pressure sensitive adhesive to obtain the light controlling film of the present invention. The optical film of the present invention was obtained by interposing this optical film between two polyvinylbutyral intermediate films by a production method similar to Example 1. Further, with a production method similar to Example 1, the optical film of the present invention was interposed using two glass sheets such that one sheet of quarter wave plate is at a glass side of the vehicle exterior side to form a laminated glass to thus obtain the functional glass of the present invention. The obtained functional glass of the present invention had a visible light transmittance of 72%. Then, a ITUD was manufactured with a production method similar to Example 1, and evaluated with a similar evaluation, and a display image in the front direction was extremely bright and clear. Also, even if an observation position was tilted in an oblique direction (approximately 50 degrees from the front direction), there was no change in the color of the display image and it was clear as in the front direction. Furthermore, in a case where arranged such that the display image becomes brighter and the slow axis of the quarter wave plate is at 45 degrees, and the display image was observed by naked eyes, the ghosting phenomenon has decreased as compared to Examples 1 and 2, and viewability of the display image further improved. In a case where this display image was Observed through commercial polarized sunglasses (absorption axis being in a direction horizontal to the ground), ghosting largely decreased and it was possible to see a display image clearly.

Example 4

At the light reflecting layer PRL-1 side of the light controlling film obtained in Example 3, broad band quarter wave plates as the light controlling layer used in Example 3 were further bonded with each other in a similar manner such that the slow axes of the respective quarter wave plates were arranged orthogonally to obtain the light controlling film of the present invention in which the light reflecting film is interposed between two quarter wave plates. By operating the production method of Example 1, this optical film was interposed between two polyvinylbutyral intermediate films to obtain an optical film of the present invention, Further, with operating the production method of Example 1, the optical film of the present invention was interposed between two glass sheets to form a laminated glass to thus obtain the functional glass of the present invention. The obtained functional glass of the present invention had a visible light transmittance of 72%. Then, using a liquid crystal projector which is the same as in Example 1 as image display units, the HUD of the present invention was manufactured by a production method similar to Example 1 except that the quarter wave plate 19 in FIG. 6 was removed and a polarizing plate (manufactured by Polatechno Co., Ltd., SHC-13U) was disposed between the reflective mirror 3 and the functional glass 18, and the light incident on the functional glass 18 was P polarized light. Then, the slow axis of the retardation element in the functional glass of the present invention was placed at such a position that the projected image becomes bright (approximately 45 degrees to an incident P polarized light), and, further, when the P polarized light was projected with an angle of incidence from a position of approximately 60 degrees from the front direction of the functional glass of the present invention and a display image was observed with naked eyes, the display image in a front direction projected on the glass was extremely bright and was clear. Also, the projected reflected light was P polarized light. Also, even if an observation position was tilted in an oblique direction (approximately 50 degrees from the front direction), there was no change in the color of the display image and it was clear as in the front direction. Furthermore, the ghosting phenomenon has decreased as compared to Examples 1 to 3, and viewability of the display image further improved. When the display image was observed through commercial polarized sunglasses (absorption axis being in a direction horizontal to the ground), ghosting largely decreased and it was possible to see a display image clearly.

Example 5

The light reflecting film of the present invention was obtained by a production method similar to Example 2 except that three layers, namely the light reflecting layer PRL-1, the light reflecting layer PRL-3, and light reflecting layer PRL-4 were laminated in place of the light reflecting layers PRL-1 to PPL-4. As can be seen from FIG. 13 and Table 4 below, the light reflecting layers PRL-1, PRL-3, and PRL-4 have a central reflection wavelength of 481 nm (half width 192 nm), 613 nm (half width 246 nm), 843 nm (half width 242 nm), respectively, and the light reflecting layers PRL-1, PRL3, and PRL-4 had reflectance at the central reflection wavelength of approximately 16%, approximately 16%, and approximately 18%, respectively.

TABLE 4

Figure 13:
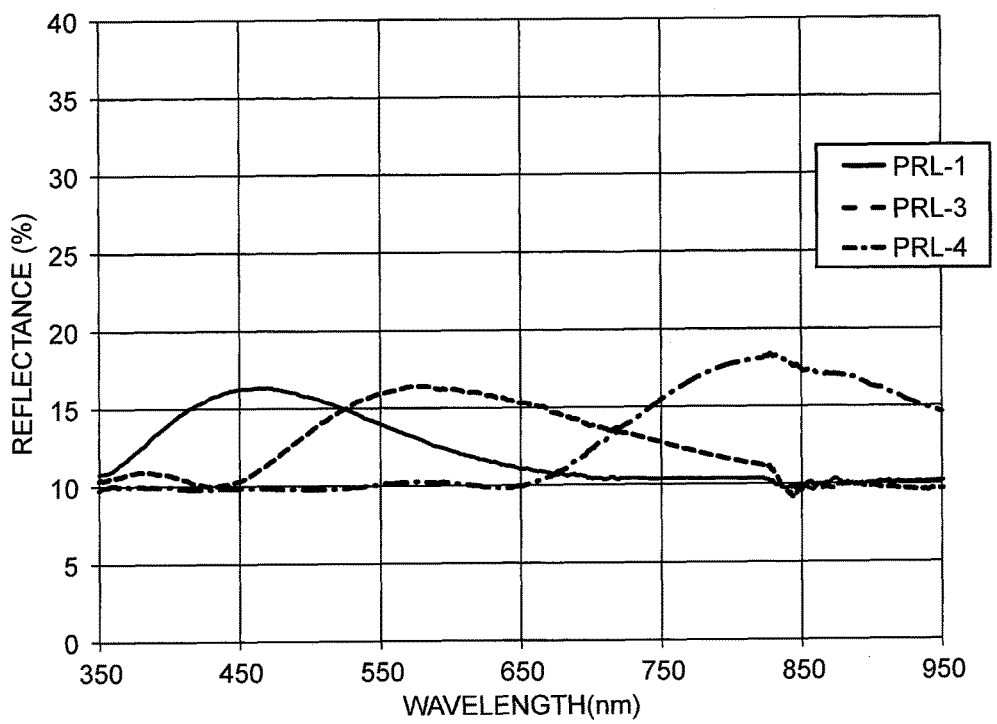
FIG. 13 is a graph showing reflection characteristics of the light reflecting layers used in Example 5, respectively.

Reflection Property of Light Reflecting Layers in FIG. 13

| | Light Reflecting Layer | | |
|---|---|---|---|
| | PRL-1 | PRL-3 | PRL-4 |
| Maximum Reflectance (%) | 16.2 | 16.0 | 17.7 |
| Central Reflection Wavelength λ2 (nm) | 481 | 613 | 843 |
| 50% Short Wavelength-Side Wavelength (nm) | 386 | 492 | 727 |
| 50% Long Wavelength-Side Wavelength (nm) | 578 | 738 | 969 |
| Half Width (nm) | 192 | 246 | 242 |

*Baseline of Reflectance of Each Light Reflecting Layer: Approx. 10%

Figure 14:
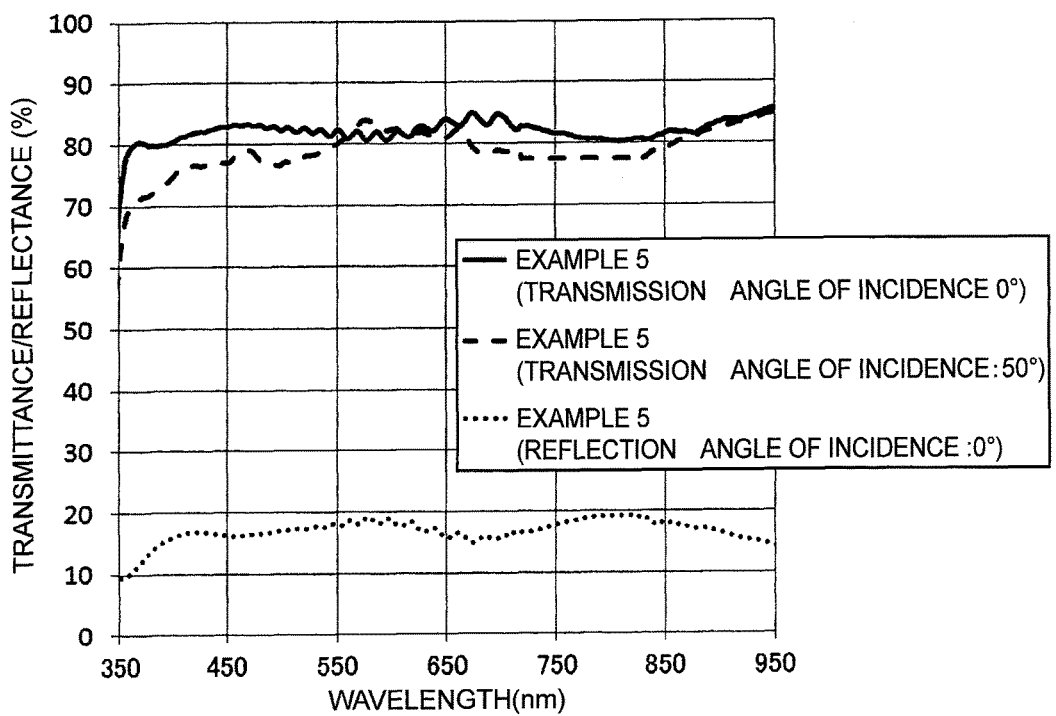
FIG. 14 is a graph showing spectral characteristics of the light reflecting film of Example 5.

FIG. 14 shows spectral characteristics of transmittance and reflectance of the light reflecting film obtained. An average transmittance of the visible light in the front direction of the light reflecting film was approximately 82%, and the reflectance in near 550 nm was approximately 18%. Also, even if the obtained light reflecting film was viewed from a position that is 50° tilted from the front, there was no change in the transmittance in the red range and the color was similar to the color in the front direction.

Further, on this light reflecting film, a quarter wave plate (manufactured by Kaneka Corporation: PCR-140) serving as a light controlling layer was laminated with a production method similar to Example 3 to obtain the light controlling film of the present invention. The optical film of the present invention was obtained by interposing this optical film between two polyvinylbutyral intermediate films by a production method similar to Example 1. Further, with a production method similar to Example 1, the optical film of the present invention was interposed between two glass sheets such that one sheet of quarter wave plate is at a glass side of the vehicle interior side to form a laminated glass to thus Obtain the functional glass of the present invention. The obtained functional glass of the present invention had a visible light transmittance of 77%. Then, a HUD was manufactured with a production method similar to Example 4, and a display image was observed with naked eyes with a method similar to Example 4, and a display image in the front direction was extremely bright and clear. Also, even if an Observation position was tilted in an oblique direction (approximately 50 degrees from the front direction), there was no change in the color of the display image and it was clear as in the front direction. Furthermore, the ghosting phenomenon has decreased as compared to Examples 1 to 3, similarly to Example 4, and viewability of the display image further improved. When the display image was observed through commercial polarized sunglasses (absorption axis being in a direction horizontal to the ground), ghosting was hardly observed, and the ghosting phenomenon decreased as compared to Example 4, and it was possible to see a display image extremely clearly.

Example 6

The light reflecting film of the present invention was Obtained by a production method similar to Example 2 except that only two layers, namely the light reflecting layer PRL-2 and the light reflecting layer PRL-4 were laminated in place of the light reflecting layers PRL-1 to PRL-4. As can be seen from FIG. 15 and Table 5 below, the light reflecting layers PRL-2 and PRL-4 have a central reflection wavelength of 540 nm (half width 158 nm), 732 nm (half width 170 nm), respectively, and the light reflecting layers PRL-2 and PRL-4 had reflectance at the central reflection wavelength of approximately 17% and approximately 18%, respectively.

TABLE 5

Figure 15:
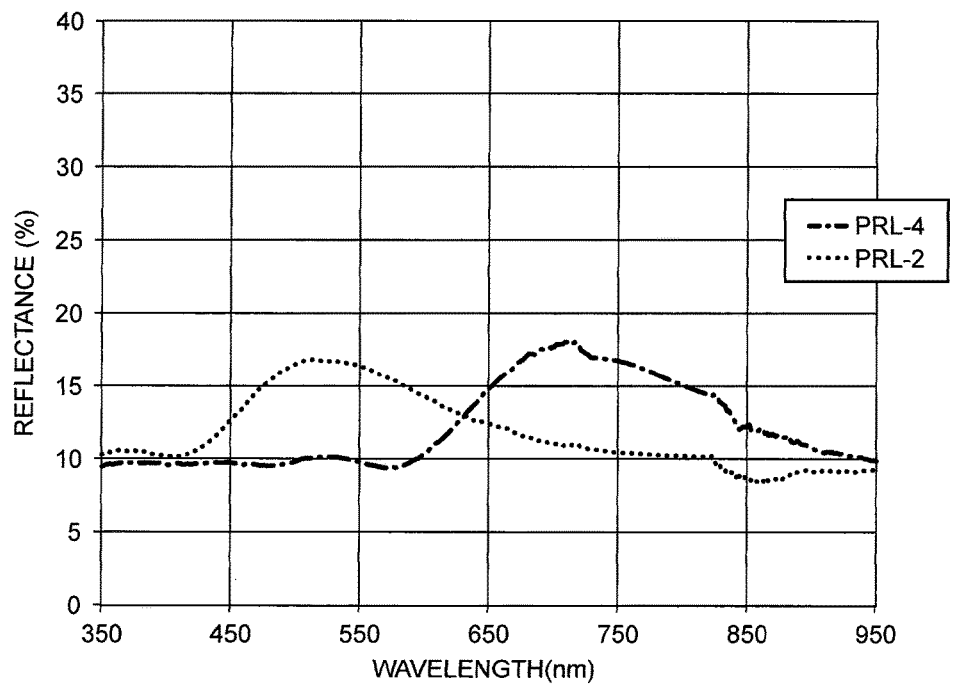
FIG. 15 is a graph showing reflection characteristics of the light reflecting layers used in Example 6, respectively.

| Reflection Property of Light Reflecting Layers in FIG. 15 | | |
| --- | --- | --- |
| Light Reflecting Layer | PRL-2 | PRL-4 |
| Maximum Reflectance (%) | 16.8 | 18.1 |
| Central Reflection Wavelength λ2 (nm) | 540 | 732 |
| 50% Short Wavelength-Side Wavelength (nm) | 459 | 647 |
| 50% Long Wavelength-Side Wavelength (nm) | 617 | 817 |
| Half Width (nm) | 158 | 170 |

*Baseline of Reflectance of Each Light Reflecting Layer: Approx. 10%

Figure 16:
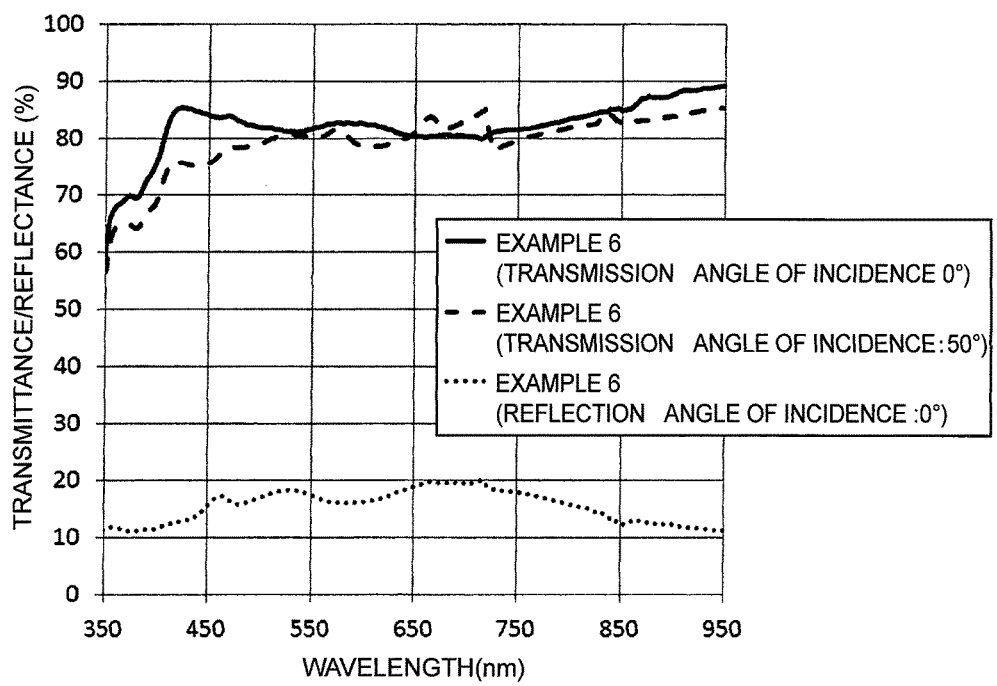
FIG. 16 is a graph showing spectral characteristics of the light reflecting film of Example 6.

FIG. 16 shows spectral characteristics of transmittance and reflectance of the light reflecting film obtained. An average transmittance of the visible light in the front direction of the light reflecting film was approximately 82%, and the reflectance in near 550 nm was approximately 17%. Also, even if the obtained light reflecting film was viewed from a position that is 50° tilted from the front, there was a little change in the transmittance in the red range and the difference in color as compared to the front direction was slight.

Further, a quarter wave plate (manufactured by Kaneka. Corporation: PCR-140) serving as a light controlling layer was laminated on this light reflecting film with a production method similar to Example 5 to obtain the light controlling film of the present invention. With a production method similar to Example 1, this optical film was interposed between two polyvinylbutyral intermediate films to obtain the optical controlling film of the present invention, Further, with a production method similar to Example 1, the optical film of the present invention was interposed between two glass sheets such that one sheet of quarter wave plate is at a glass side of the vehicle interior side to form a laminated glass to thus obtain the functional glass of the present invention, The obtained functional glass of the present invention had a visible light transmittance of 77%. Then, a HUD was manufactured with a production method similar to Example 4, and a display image was observed with naked eyes with a method similar to Example 4, and a display image in the front direction was bright and clear. Also, even if an observation position was tilted in an oblique direction (approximately 50 degrees from the front direction), there was no change in the color of the display image and it was clear as in the front direction. Furthermore, the ghosting phenomenon decreased as compared to Examples 1 to 3, similarly to Example 4, and viewability of the display image further improved. When the display image was observed through commercial polarized sunglasses (absorption axis being in a direction horizontal to the ground), ghosting was hardly observed, and the ghosting phenomenon decreased as compared to Example 4, and it was possible to see the display image extremely clearly.

Comparative Example 1

In place of the light reflecting film of the present invention, a laminated glass was manufactured by a production method similar to Example 1 except that a PET film on which aluminum is deposited such that reflectance in the visible light range was 23%. Then, a HUD was manufactured by a production method similar to Example 1, and a similar evaluation was performed, the display image in the front direction was darker than in Examples and was poor in clearness.

Comparative Example 2

With a production method similar to Example 1, the light reflecting film in which three light reflecting layers are laminated was obtained using three light reflecting layers having a half width different from Example 1. The central reflection wavelength of each of the light reflecting layers was 450 nm (half width 40 nm), 540 nm (half width 40 nm) and 650 nm (half width 50 nm), and the light reflecting layers had reflectance at the central reflection wavelength of approximately 20%, approximately 40% and approximately 40%, respectively. Average transmittance of the visible light in the front direction of the light reflecting film was approximately 55%, and the reflectance near 550 nm was approximately 40%. Then, when the obtained light reflecting film was viewed from a position that is 50° tilted from the front, it had a red color and the color was different from the color in the front direction. Then, with a production method similar to Example 1, the obtained optical reflection film was interposed between two polyvinylbutyral intermediate films, and then a laminated glass was produced using the two glass sheets. The obtained laminated glass had a visible light transmittance of 50%. Then, a HUD was manufactured with a production method similar to Example 1, and a display image was observed in a similar manner, and it showed that viewability of the display image decreased due to an increase in transmittance, but a display image in the front direction was very bright. However, when an observation position was tilted in an oblique direction (approximately 50 degrees from the front direction), the brightness decreased and further the color of the display image changed. Particularly, the red display was not dear.

Comparative Example 3

Without using the light reflecting film of the present invention, an isobutylene resin (manufactured by BASF AG: Oppanol B10) was placed as an intermediate film between the two glass sheets used in Example 1 at 100° C. in a molten condition, and shaped and cooled at room temperature such that the resin layer has a thickness of approximately 100 μm at one end of the laminated glass and the resin layer has a thickness of approximately 400 μm at the other end of the laminated glass to manufacture a laminated glass in which a pseudo-wedge shaped intermediate film having wedge shaped cross-section in the thickness direction is interposed. HUD was manufactured by a production method similar to Example 4, except that such a laminated glass without a quarter wave plate was arranged in place of the functional glass 18 of FIG. 6 such that a part where the resin layer has a smaller thickness (approximately 100 μm) is at a lower part, and that light incident on the laminated glass was S-polarized light. This was observed by naked eyes by a method similar to Example 4, and although there was a place where the ghosting phenomenon decreased depending on the observation position, the ghosting phenomenon appeared when the observation position was slightly changed, and, there was a variation in an evaluation of the viewability of the display image. Further, when this display image was observed through commercially available polarized sunglasses (absorption axis is in a direction horizontal to the ground), the display image became almost invisible and did not have a t unction as a HUD.

Comparing Examples 1 to 6 with Comparative Example 1, Comparative Example 1 does not have reflection characteristics to particular polarized light and thus even if incident light is polarized light, brightness is only equivalent to light reflectance of ordinary light, and the projected image also becomes dark. On the other hand, in the case of Examples 1 to 6, reflection to particular polarized light is great, and thus projected light that has become polarized light only reflects with reflectance which is higher than reflectance of ordinary light, and thus a bright, clear projected image can be seen. Also, in Example 1, as can be seen in FIG. 11, as the viewing position is tilted from the front, transmittance of the red range increases, and thus the color of the projected image changes, and in Examples 2 to 6 in which a light reflecting layer PRL-4 was further laminated, as can be seen in FIGS. 12, 14 and 16, even if the viewing position is tilted, there is no change in transmittance, and a projected image as in the front direction can be seen. Also, in Example 3 to 6, as can be elucidated from comparison with Comparative Example 3, by using a quarter wave plate, since the projected image is bright, and the ghosting phenomenon is reduced, and further, the display image is clearly seen even through polarized sunglasses, further, it can be seen that viewability of the projected image is improved. Particularly, in Examples 5 and 6, the ghosting phenomenon when polarized sunglasses are worn is further improved, and it can be seen that an extremely excellent viewability is Obtained.

Further, in Comparative Example 2, when a light reflecting layer having high reflectance is used, it is not suitable for a windshield of a motor vehicle because of a reduced transmittance. Also, since the half width of each light reflecting layer is narrow, even if bright in the front direction, the wavelength of the light source and the reflection wavelength will be offset by being tilted, and a bright display image cannot be obtained. On the other hand, in the case of Examples 1 to 6, the transmittance is higher than the transmittance regulation value of the automotive windshield even in the laminated glass, and, further, since the half width of each light reflecting layer is broad, a bright display image can be seen even in a front direction or in a case where the observation position is tilted. Particularly, as in Examples 2 to 6, with the PRL-4 compensating for a wavelength shift due to inclination, a bright display image can be seen without change in color both in the front direction and in a case where the observation position is tilted.

INDUSTRIAL APPLICABILITY

With the light reflecting film of le present invention, it is possible to effectively improved reflectance to a particular polarized light only, while having high visible light transmittance. Therefore, in a case where the light reflecting film of the present invention is used for a windshield of a motor vehicle, by improving reflectance to the particular polarized light only, while maintaining the legal transmittance regulation value, it is possible to project a projected image of the head-up display brightly and clearly, and the driver can see a clear image at any portion of the windshield.

LIST OF REFERENCE SIGNS 1 observer
2 image display units
3 reflective mirror
4 windshield
5 optical path
6 display image
7 light reflecting layer PRL-1
8 light reflecting layer PRL-2
9 light reflecting layer PRL-3
10 adhesive layer
11 light reflecting film
12 light reflecting layer PRL-4
13 light reflecting film
14 light reflecting film or light controlling film
15 intermediate film
16 optical film
17 glass
18 functional glass
19 quarter wave plate
20 light controlling film
21 light absorbing layer
22 light controlling film
23 quarter wave plate
24 light controlling film

The invention claimed is:

1. A light controlling film comprising a light reflecting film and a light controlling layer that are laminated,
   the light reflecting film including at least two light reflecting layers that are laminated, the at least two light reflecting layers including at least one of light reflecting layers among a light reflecting layer PRL-1, a light reflecting layer PRL-2 and a light reflecting layer PRL-3,
   the light reflecting layer PRL-1 having a central reflection wavelength of greater than or equal to 400 nm but less than 500 nm and a reflectance to ordinary light at the central reflection wavelength of greater than or equal to 5% but less than or equal to 25%,
   the light reflecting layer PRL-2 having a central reflection wavelength of greater than or equal to 500 nm but less than 600 nm and a reflectance to ordinary light at the central reflection wavelength of greater than or equal to 5% but less than or equal to 25%,
   the light reflecting layer PRL-3 having a central reflection wavelength of greater than or equal to 600 nm but less than 700 nm and a reflectance to ordinary light at the central reflection wavelength of greater than or equal to 5% but less than or equal to 25%,
   the at least two light reflecting layers having central reflection wavelengths that are different from each other,
   all of the at least two light reflecting layers that are laminated having a property of reflecting polarized light that has the same orientation,
   the light controlling layer comprising two quarter wave plates,
   the light reflecting film being laminated so as to be interposed between the two quarter wave plates,
   wherein each of the light reflecting layers has a half width of greater than or equal to 100 nm but less than or equal to 500 nm, and the half width is a full width at half maximum which is a width of wavelength defined by a difference between a wavelength at a long wavelength side and a wavelength at a short wavelength side corresponding to 50% of a maximum reflectance of each of the light reflecting layers, and
   wherein a wavelength corresponding to 50% of the maximum reflectance is calculated based on a reflectance derived from selective reflectance obtained by subtracting an average value of a reflectance other than the selective reflection region from a value of the maximum reflectance in the selective reflection region.

2. The light controlling film according to claim 1, wherein the two quarter wave plates are laminated with such a positional relationship that slow axes are orthogonal to each other.

3. An optical film comprising the light controlling film according to claim 1 and at least one intermediate film that are laminated.

4. The optical film according to claim 3, wherein the light controlling film is laminated such that the light controlling film is interposed between two intermediate films.

5. A functional glass comprising the optical film according to claim 3.

6. The functional glass according to claim 5, wherein the optical film is interposed between two glass sheets to constitute a laminated glass.

7. A head-up display comprising the optical film according to claim 3.

8. The head-up display according to claim 7, wherein the head-up display comprises a projector for displaying an image, the projector is provided with a P polarized light emitting units, and the optical film is disposed in a laminated manner such that a slow axis of the quarter wave plate is at 45 degrees to emitted P polarized light.

9. A functional glass comprising the light controlling film according to claim 1.

10. The functional glass according to claim 9, wherein the light controlling film is interposed between two glass sheets to constitute a laminated glass.

11. A head-up display comprising the functional glass according to claim 9.

12. A head-up display comprising the light controlling film according to claim 1.

13. The head-up display according to claim 12, comprising a projector for displaying an image, the projector being provided with a circularly-polarized light emitting units to emit circularly polarized light in the same orientation as circularly polarized light selectively reflected by the light reflecting film.

14. The head-up display according to claim 12, comprising a projector for displaying an image, the projector being provided with a P polarized light emitting units.

15. The head-up display according to claim 14, wherein the light controlling film is disposed in a laminated manner such that a slow axis of the quarter wave plate is at 45 degrees to emitted P polarized light.

16. The head-up display according to claim 14, wherein the functional glass is disposed in a laminated manner such that a slow axis of the quarter wave plate is at 45 degrees to emitted P polarized light.

17. The light controlling film according to claim 1, wherein the at least two light reflecting layers further include a light reflecting layer PRL-4 having a central reflection wavelength of greater than or equal to 700 nm but less than or equal to 950 nm and a reflectance to ordinary light at the central reflection wavelength of greater than or equal to 5% but less than or equal to 25%,
   the light reflecting layer PRL-4 having a property of reflecting polarized light that has the same orientation as the light reflecting layer PRL-1, the light reflecting layer PRL-2 and the light reflecting layer PRL-3.

* * * * *

UNITED STATES PATENT AND TRADEMARK OFFICE
CERTIFICATE OF CORRECTION

PATENT NO. : 10,241,241 B2
APPLICATION NO. : 15/502899
DATED : March 26, 2019
INVENTOR(S) : Kouichi Tanaka et al.

It is certified that error appears in the above-identified patent and that said Letters Patent is hereby corrected as shown below:

In the Specification

Column 2, Line 12, "No. H11.-249062" should read -- No. H11-249062 --

Column 2, Line 36, "Further, the liquid crystil" should read -- Further, the liquid crystal --

Column 4, Line 17, "absorbing layer.)" should read -- absorbing layer. --

Column 5, Line 14, "FEUD" should read -- HUD --

Column 6, Line 35, "rim but less than 600 nm and a reflectance to ordinary'" should read -- nm but less than 600 nm and a reflectance to ordinary --

Column 8, Line 40, "reflection wavelength of the not reflecting" should read -- reflection wavelength of the light reflecting --

Column 8, Line 67, "pentaerythrifoltetra(meth)acrylate," should read
-- pentaerythritoltetra(meth)acrylate, --

Column 9, Line 5, "tris(acryloxyethyl)isocyarturate" should read -- tris(acryloxyethyl)isocyanurate --

Column 9, Line 12, "triethylenegly col-d (ineth)acrylate," should read
-- triethyleneglycol-di-(meth)acrylate, --

Column 9, Line 65, "compounds such as benzoyibenzoic acid," should read -- compounds such as benzoylbenzoic acid, --

Column 10, Line 22, "be nzophenone-ba.sed" should read -- benzophenone-based --

Column 10, Line 29, "INlichler's" should read -- Michler's --

Signed and Sealed this
Thirtieth Day of July, 2019

Andrei Iancu
*Director of the United States Patent and Trademark Office*

CERTIFICATE OF CORRECTION (continued)
U.S. Pat. No. 10,241,241 B2

Column 10, Line 64, "m.ade" should read -- made --

Column 12, Line 21, "a plurali-tyof" should read -- a plurality of --

Column 15, Line 14, "snore" should read -- more --

Column 15, Line 28, "a not" should read -- a light --

Column 17, Line 32, "light film" should read -- light controlling film --

Column 19, Line 1, "a. railway carriages," should read -- a railway carriages, --

Column 19, Line 2, ".As" should read -- As --

Column 19, Line 25, "the intermediate film." should read -- the intermediate film --

Column 19, Line 40, "controlling film)" should read -- controlling film of --

Column 19, Line 47, "P polarized fight," should read -- P polarized light, --

Column 19, Line 57, "BUD" should read -- HUD --

Column 20, Line 64, "glass is unproved," should read -- glass is improved, --

Column 23, Line 50, "550 rim" should read -- 550 nm --

Column 23, Line 59, "0.38 man" should read -- 0.38 nm --

Column 25, Line 33, "Then, a ITUD" should read -- Then, a HUD --

Column 29, Line 48, "not have a t unction" should read -- not have a function --

Column 30, Line 31, "With the light reflecting film of le" should read -- With the light reflecting film of the --